United States Patent [19]

Aizatulov et al.

[11] Patent Number: 5,378,261
[45] Date of Patent: Jan. 3, 1995

[54] METHOD FOR PRODUCING STEEL

[75] Inventors: Rafik Aizatulov; Boris Kustov; Grigori Galperin, all of Novokuznetsk; Iakov Grenader, Moscow, all of Russian Federation; Gregory Gitman, Atlanta, Ga.

[73] Assignee: Zaptech Corporation, Norcross, Ga.

[21] Appl. No.: 67,859

[22] Filed: May 26, 1993

Related U.S. Application Data

[63] Continuation-in-part of Ser. No. 889,018, May 26, 1992.

[51] Int. Cl.$^6$ .................................................. C21C 5/28
[52] U.S. Cl. ........................................ 75/528; 266/225
[58] Field of Search .............................. 266/225; 75/528

[56] References Cited

U.S. PATENT DOCUMENTS

| | | | |
|---|---|---|---|
| 4,198,230 | 4/1980 | Brotzmann et al. | 75/59 |
| 4,304,598 | 12/1981 | von Bogdandy et al. | 75/60 |
| 4,426,709 | 1/1984 | Fegerl | 266/225 |
| 4,537,629 | 8/1985 | Lazcano-Navarro et al. | 75/52 |
| 4,605,437 | 8/1986 | Sugiura et al. | 75/43 |
| 5,084,093 | 1/1992 | Yamaoka et al. | 75/529 |

FOREIGN PATENT DOCUMENTS

| | | | |
|---|---|---|---|
| 2719981 | 5/1977 | Germany | C21C 5/28 |
| 2729982 | 7/1977 | Germany | C21C 5/28 |
| 2729983 | 7/1977 | Germany | C21C 5/28 |
| 2816543 | 4/1978 | Germany | C21C 5/28 |
| PCT/SU83/-00025 | 7/1983 | U.S.S.R. | C21C 5/28 |
| PCT/SU85/-00104 | 12/1985 | U.S.S.R. | C21C 5/28 |

*Primary Examiner*—Peter D. Rosenberg
*Attorney, Agent, or Firm*—Needle & Rosenberg

[57] ABSTRACT

A steel making process is disclosed that utilizes solid ferrous metallic material as a substantial part of the metallic charge and uses heat released by combustion of two different types of carbonaceous materials and steel scrap that have been strategically charged inside of at least a partially refractory lined steel making vessel. One of the carbonaceous materials contains a high content of volatile hydrocarbons and is primarily responsible for early preheating and partial melting of the solid ferrous material. The second carbonaceous material contains a low content of volatile hydrocarbons and is primarily responsible for providing a reducing capability to the slag, for carburizing the melt and for providing additional heat generated by combustion which is used to enhance heating and melting of solid ferrous materials. This method of steel making also consists of the controllable introduction of oxygen rich oxidizing gas which initially is used for combustion of said hydrocarbons in the carbonaceous materials to melt solid ferrous metallic material and further is used for ignition and burning of a part of preheated solid ferrous metallic material located in central zone of the furnace and for refining the accumulated molten pool of ferrous material before tapping. Slag forming material is used at the bottom of the furnace to provide for continuous refining of molten ferrous material including removal of phosphorus and sulfur throughout entire steel making process. Liquid ferrous materials also can be charged in some embodiments of this method of steel production. Electrical energy may be used as an additional heat source to increase the metallic yield.

17 Claims, 7 Drawing Sheets

METHOD FOR PRODUCING STEEL

This application is a continuation-in-part of application Ser. No. 07/889,018, filed May 26, 1992.

FIELD OF THE INVENTION

The invention relates to a method of steelmaking in a furnace having at least partially refractory lined walls, particularly in basic oxygen and electric arc furnaces processing a metallic charge. The invention can be used to produce steel from an entire solid ferrous metallic charge or when liquid ferrous metallic material is also charged as a part of ferrous metallic material. The solid metallic charge can be comprised of different types of ferrous materials such as steel scrap, pig iron, direct reduced iron in form of pellets, lumps or briquettes, etc.

BACKGROUND OF THE INVENTION

Known steelmaking processes for processing a solid ferrous charge consist of certain generic steps such as: charging solid ferrous metallic materials, directing heat toward the surface of charged metallic pieces, charging slag-forming material, superheating and refining the molten pool and discharging the molten metal and slag.

The different steelmaking processes are distinct due to essential differences in the techniques of conducting one or more of these steps. The known steelmaking processes are also distinct due to essential cross-dependence and cross-influences of these steps. In many cases, to maintain the competitiveness of a steelmaking process, these steps are carefully optimized with respect to each other, so that an innovation in one process step or parameter may require a substantial alteration of traditional engineering philosophy that has been previously used to design one or more of the basic steelmaking steps.

The processes of metallic scrap melting that are used to produce molten steel are varied based on the source or sources of heat which are used to accomplish the melting. Modern electric arc furnaces are capable of transferring, in a very short time, more than 250 kwh/ton of thermal energy into the scrap to be melted. But the high cost of electricity and low thermal efficiency of these furnaces (less than 50%) continuously motivates the steelmaking industry to develop new steelmaking processes which utilizes less expensive heat from the combustion of fuel to preheat and melt scrap.

For example, U.S. Pat. Nos. 4,622,007 and 4,642,047 teach how to melt steel by using a plurality of burners as an energy source to preheat scrap and then to direct multiple oxidizing flames toward the preheated scrap to melt it down by partial oxidation. This method is utilized now in many electric arc furnaces equipped with auxiliary burners. Today, electric arc furnaces are responsible for processing approximately 70% of ferrous scrap in the United States and other developed countries.

Numerous attempts to develop a new, more advanced steelmaking technology utilizing solid scrap and the heat released by combustion of different fuels (including solid carbonaceous materials) have been conducted around the world during many decades in order to provide a competitive alternative to electric arc steelmaking. At the same time, the integrated steel companies involved in the production of primary steel from molten blast furnace ("hot") iron are motivated to increase the fraction of metallic scrap utilized in the production, because ferrous solid scrap is significantly cheaper than hot iron and can be charged and processed in a basic oxygen furnace by transferring from auxiliary combustion sources the additional heat, which is necessary to melt this additional solid charge.

Several methods of producing steel from a solid metallic charge are described in German patents Nos. 2,719,981; 2,729,982; and 2,816,543 and also in international patent application No. PCT/SU83/00025. All of these methods can be carried out in a basic oxygen furnace equipped with bottom and side tuyeres that are used to supply gaseous oxygen as the oxidizing gas and solid carbonaceous fuel or liquid and/or gaseous hydrocarbons as a fuel.

The shortcomings of these methods originate chiefly from the necessity to supply liquid, gaseous and solid carbonaceous fuels through the oxygen tuyeres. Major deficiencies in this method are: the excessive wear of refractory lining in areas surrounding the tuyeres; the high content of CO in exhaust gases and, therefore, low thermal efficiency; and excessive metallic losses by oxidation due to substantial exposure of essentially the entire scrap surface to a fraction of oxygen being supplied throughout multiple tuyeres. The significant part of oxygen that is not able to react with carbon or other fuel reacts first with the metallic charge, creating metallic oxides. The fuel supply system, as well as the system for preparation and transport of the fine-grained solid fuel materials, requires complex additional equipment, which results in an increase in capital and operating expenses.

Moreover, these systems may be less economical due to increased fuel consumption and prolonged heating time.

Any steelmaking process utilizing solid ferrous material and conducted in a high temperature furnace involves several concurrent process steps cross-influencing each other. To be converted from solid to the liquid form ferrous metallic material has to receive a significant amount of heat. This heat should be transferred very rapidly to make the steel-making process economical. At elevated temperatures (above 900° C.) the oxidation of solid ferrous materials exposed to a gaseous atmosphere containing unconsumed oxygen is accelerated very rapidly, creating solid oxide scale which insulates metallic pieces from heat transfer. Further, when oxides become liquid, they run down together with the iron-carbon melt to the colder bottom of the furnace, influencing the chemistry of accumulated metallic melt and slag and the heat and mass balance of reactions between carbon and other components of slag and molten metal.

When fuels such as liquid or gaseous hydrocarbons and/or carbonaceous solid materials are burned to release the heat needed to melt solid ferrous material, the hot combustion products that occupy the furnace atmosphere actively react with solid ferrous material. The temperature and chemistry of these hot combustion products influence the rate of heating and oxidation and, therefore, the dynamics of oxide generation in the scrap pile and the rate of its introduction into the accumulated slag.

The timing of slag formation and its chemistry is also influenced by dynamics of the supply of heat, slag forming materials and carbon into the furnace wherein the slag formations takes place. The carbon content in the slag, the slag temperature, and basicity influence the reactions between the oxides of the slag, the sulfur, phosphorus and silicon in the slag and the iron-carbon melt during the entire steelmaking process.

Existing methods of steelmaking speed scrap melting by placing hot combustion products inside of a scrap pile in such a way that maximum contact between the combustion products and the surface area of scrap is realized to maximize heat transfer. In order to provide contact between the entire surface area of scrap and hot combustion gases, oxygen is fed from many directions, fluid fuel is fed to mix with oxygen by the tuyeres or burners to arrange good mixing, and carbonaceous material is placed inside of the scrap pile by batch charging.

When the maximum surface area is exposed to the oxygen flow supplied from multiple points to oxidize carbonaceous material, during the low temperature stage preheating, the metallic surface is not rapidly affected by the oxidation process. But later, when the scrap surface becomes hot, excessive oxygen contact results in rapid and excessive iron oxide production in regions of the scrap pile. This excessive iron oxides production occurring during the earlier stages of solid scrap heating later cools the slag by endothermic reaction between the iron oxides and the carbonaceous materials collected in the slag. This also leads to increased oxidation of the iron-carbon melt during melt superheating which reduces metallic yield and process competitiveness. Excessive oxidation of the scrap surface also results in the formation of a heat insulating layer of oxides on the scrap surface, which reduces the rate of heat transfer and increases the duration of scrap preheating and melting.

When cold solid materials are charged on the bottom of a furnace that is not provided with local heat input means near the bottom, they cool down the bottom lining very rapidly. Later, during the melting cycle, a first portion of molten material reaches the colder furnace bottom zone. Contact between this first portion of molten material and the cold bottom lining results in solidification of this first portion mixed with a fraction of the solid charge that has been charged on the bottom of the furnace. These solidified materials stay solid until a later part of the melting cycle and only when the molten metallic pool becomes substantially hot does this solidified bottom layer melt down and begin to participate in the refining reactions. This results in a significant increase in the duration of the steelmaking cycle.

Due to the recognition of such negative influence of having a cold bottom zone, the patents referenced above disclose means, such as burners or tuyeres, for providing local heat input to keep the furnace bottom zone hot during steelmaking process. Unfortunately, the introduction of oxidizing gas near the bottom of the furnace for the purpose of combustion of auxiliary fuel triggers the chemical reactions of oxidation of molten materials actively competing for oxygen with said fuel. This negatively affects the efficiency of the entire steelmaking process, including the metallic yield, the rate of slag formation, the length of melting and refining, and the predictability of melt chemistry.

Therefore, in order to provide for high productivity and efficiency of steelmaking processes utilizing solid ferrous metallic material and fuel consisting of hydrocarbons and solid carbon, it is important to protect the solid material from excessive oxidation during entire melting down cycle.

It is also important to provide for hot combustion products at the bottom of the scrap pile, so that the lower part of scrap pile and the melt itself can be continuously heated, thereby protecting a significant part of the first portion of the melt from solidification by contacting the colder bottom of the furnace.

At the same time, to reduce the duration of the steelmaking cycle by providing for continuous refining of the melt, it is desirable to provide for continuous dephosphorizing and desulfurizing of the melt by placing it in contact with hot high basicity slag as early as possible.

In order to increase the metallic yield when 100% solid ferrous material is used for steel production, it is important to provide for continuous carburizing of the iron-carbon melt collected at the bottom of the furnace via contact with hot solid carbon.

In order to increase the flexibility of a steelmaking process utilizing solid ferrous metallic material, it is desirable to provide the capability of using not only solid steel scrap, but also solid pig iron, direct reduced iron, a fraction of back charged molten steel, a portion of hot iron, a mixture of liquid steel and liquid iron, or other liquid ferrous metallic materials that have been specially produced and/or supplied by an auxiliary source of liquid ferrous metal.

SUMMARY OF THE INVENTION

It is an object of the present invention to provide a higher thermal efficiency steelmaking process that utilizes carbonaceous solid material as a fuel source and reduces the wear of the refractory lining and loss of metallic yield by oxidation during the steelmaking process.

It is another object of the present invention to provide for high productivity of the steelmaking process by reducing the time needed to melt the solid ferrous metallic charge.

It is another object of the present invention to provide a steelmaking process with the flexibility to utilize a broad variety of solid and liquid ferrous metallics materials to share in the ferrous material to be processed.

It is a further object of the present invention that it can be conducted in many differently designed existing steelmaking furnaces that have a refractory lined part to hold molten metal. For instance, an existing basic oxygen furnace (BOF) can be used as one of the possible furnace designs to practice this invention, as well as a modified electric arc furnace (EAF) with 3 electrodes, or a direct current EAF having one electrode.

The present invention accomplishes these and other objects by a plurality of controllable process steps which make the new process very repeatable and easy to implement. This invention utilizes a solid ferrous metallic material charge, which may comprise steel scrap, pig iron or direct reduced iron alone, but which may be also used in combination with a liquid metallic charge provided with the ladle of molten "hot" iron or residual molten steel or other liquid ferrous metallic material. The heat utilized in this process for initial solid ferrous metallic charge preheating and melting is essentially supplied by the heat of liquid metallic material charge and the heat that has been generated by the burning of preferably two different types of solid carbonaceous fuels strategically charged in time and space into the furnace to provide for rapid preheating of scrap with minimal oxidation of the scrap surface, for protecting the scrap surface during melting and, further, for effective carburization of the iron-carbon melt and for partial reducing of iron oxides generated during melting of the scrap. These fuels are controllably oxidized, primarily with the use of a centrally directed top blown oxidizing gas. This oxidizing gas is controllably provided to the furnace in such a way that it is first introduced and partially consumed to maintain efficient oxygen rich afterburning of hydrocarbons and CO exhausted from the charged materials, and further infiltrates into the central furnace zone occupied with the charged materials, remote from the furnace side walls where oxygen is partially consumed by reacting with CO, hydrocarbons and other combustible materials in that zone. The residual unconsumed oxidizing gas finally travels to the outside of the central furnace zone where it is consumed. Due to the depletion of the oxygen supply through previous oxidation reactions, the substoichiometric combustion conditions for volatilized CO and hydrocarbons in this outer peripheral zone and a reduced temperature is maintained. These substoichiometric conditions are maintained outside the central furnace zone, in the space between the central zone and the side walls of the furnace, where the majority of the metallic charge is located to be preheated and then melted with minimum oxidation. The required controllability of oxygen introduction is provided continuously in both the central and outer regions of the furnace by maintaining a predetermined flow of oxidizing gas and by positioning the movable top lance at one or more predetermined positions above the solid charge and, later, above the molten metal.

The first of these solid carbonaceous fuels preferably is essentially a solid carbon with low volatile hydrocarbon content (less than 20%, preferably less than 10% and most preferably less than 5% of volatile hydrocarbons) and with low ash content, for example, coke or anthracite coal, and the second solid carbonaceous fuel is long-flame coal and/or bituminous coal and/or gas coal containing up to 50%, but preferably no less than 20% of volatile hydrocarbons and most preferably no less than 25% volatile hydrocarbons. The first carbonaceous fuel is essentially used for metallurgical purposes as a melt carburizing agent and iron oxide reducing agent, and as a prime carbonaceous fuel during the final high temperature stage of scrap melting. It is continually charged in such amounts that it partially survives heating and oxidation by combustion products and by oxygen blowing during at least a part of scrap preheating and the earlier stages of scrap melting. The second solid carbonaceous material should first be consumed partially by rapid volatilization when initially preheated and then by oxidation of residual carbon during solid metallic charge preheating and melting. A fraction of solid carbon of both carbonaceous fuels is initially oxidized to CO while contacted by oxygen and further to $CO_2$ by afterburning of CO while it is contacted with oxygen inside and above the pile of charged solid metallic materials. For production of low sulfur steel, it is beneficial to use carbonaceous fuel materials having low sulfur content.

This method also uses the further step of igniting a fraction of the preheated steel scrap present in the ferrous metallic charge occupying the central furnace zone to raise the temperature to the very high level that is needed to melt rapidly the surrounding scrap, primarily by radiation from the central iron burning zone. Such ignition is preferably accomplished by raising the oxidizing gas flow to the level at which the delivery of oxygen into the central zone significantly exceeds the amount needed to provide complete oxidation of volatilized combustibles. This central zone develops the shape of the well when the part of the solid ferrous metallic material located in this zone is burned and melted down. This central zone is shielded from the furnace wall by the colder scrap located in the peripheral (outer) furnace zone closer to the furnace side walls, so that the refractory lining is protected from high temperature abuse.

Staged oxidation of both of these carbonaceous materials is differentiated not only in the timing of the stages, which results from the rapid volatilization of hydrocarbons of the second carbonaceous fuel, but also in spacing because different conditions of oxidation are maintained for the carbonaceous materials charged inside the central zone of the furnace and those charged outside the central zone of the furnace. By controlling the introduction of the oxidizing gas during the entire preheating period and by controlling the charging of both carbonaceous materials, the maintenance of an essentially reducing furnace atmosphere is continuously provided for the majority of the metallic scrap charge.

When the solid ferrous material located in the central zone is essentially preheated, the oxygen flow is preferably controllably increased to provide for rapid ignition of at least part of the hot steel scrap located in the center of the furnace. During this period of time the flow of oxygen inside the central zone is significantly higher than needed for complete combustion of the volatile hydrocarbons and CO generated by oxidation of the carbonaceous fuel in this zone. The oxidization of the hot ferrous material releases a large amount of heat very rapidly in the central zone located well away from the furnace walls. During this period of time, the metal being combusted radiates a very high heat flux toward the surrounding scrap, which is still protected by the surrounding products of incomplete combustion generated by primarily substoichiometric oxidation of carbonaceous material charged outside the central zone of the furnace. Thus, most of the metallic surface is protected and metallic yield loss kept low, making the process economically very attractive. By controlling the introduction of oxidizing gas, the rate of oxidization of carbonaceous materials located in the central zone of the furnace is maintained higher than outside of the central zone of the furnace, so that oxidation of the carbonaceous materials is not only staged in time but also in space.

It is important, for this invention, to provide the charging of carbonaceous material on the top of the solid ferrous material continually in an amount approximately corresponding with the flow of oxygen blown toward the pile of solid materials. This will avoid an excessive release of hydrocarbons from the carbonaceous material leading to a large accumulation of unburned hydrocarbons significantly in excess of the instant supply of oxygen, which can, in turn, lead to an excessive release of CO and unburned hydrocarbons into the atmosphere and to the generation of dangerous explosive conditions.

In order to provide the maximum process time possible for refining the iron-carbon melt, this method preferably includes the steps of charging basic slag forming material prior to the charging of solid ferrous metallic material, so that the slag forming material is placed under said solid ferrous metallic material. This method preferably uses some fraction of hot slag been retained from a previously tapped heat so that slag forming material is charged on the top of this retained slag. The chemistry and added mass of charged slag forming material alters the hot retained slag basicity, temperature and viscosity before substantial melting takes place. The charge of slag forming material should provide for a basicity of the thickened altered slag exceeding 2.0, and preferably 3.0. This step of charging slag forming material causes a reduction in retained slag temperature and an increase in altered slag viscosity. Colder viscous altered slag is used to support the layer of said first solid carbonaceous fuel which is next charged on the top of this thickened slag, so that, during earlier stages of melting, the ferrous metallic melt can be reduced and carburized as it runs through the layer of carbonaceous fuel located above the thickened slag, which, due to its low temperature, does not interfere with carbon-oxides reaction. This will continue until significant amounts of the accumulated iron-carbon melt finally overheat the thickened slag to the temperature at which the slag becomes fluid and capable of flowing up through the accumulated melt and floating on the top of the melt where light carbonaceous material layers are accumulated. Therefore, this method provides for carburizing and accumulating a molten ferrous stream while preventing the cooling effect of endothermic reducing reactions between carbon and metal oxides of the thickened slag during the earlier stage of metallic charge preheating and melting. This method also prevents rapid cooling of the furnace bottom refractory lining by maintaining the presence of the hot altered slag prior to accumulating iron-carbon melt on the bottom of the furnace. Therefore this method reduces the heat loss from the melt to the cooled down bottom lining and also provides for earlier dephosphorizing, desulfurizing and carburizing the accumulated iron-carbon melt initially contacted by the hot carbon layer from the top and the hot thickened high basicity slag from the bottom.

When an electric arc furnace is used for practicing this invention, the final stages of melting, superheating and refining are preferably to be conducted by the use of electric arc energy. This should reduce or completely eliminate the need for igniting and burning the metallic charge with oxidizing gas inside of the central zone of the furnace as described above. This will further increase the metallic yield of the present invention and further increase the competitiveness of conventional electric arc technology.

Some modifications of the above described method of steelmaking is required when the solid ferrous metallic charge primarily consists of iron in form of direct reduced iron (DRI) and/or pig iron. These modifications are needed due to the difference in many physical and chemical characteristics of solid iron versus solid steel material that influence the metallic charge behavior during preheating and melting and the iron-carbon melt characteristics, such as the initial carbon content and the melting temperature of the melt.

First, when solid pig or direct reduced iron is processed, most of the heat released from the oxidation of iron is released via oxidation of the accumulated iron-carbon melt by oxidizing gas after at least a fraction of the solid iron is initially melted. When the iron-carbon melt is oxidized, a significant amount of heat is released. This heat is used to superheat the melt and to melt the submerged solid charge. A significant amount of CO is also generated during the oxidation of carbon inside the accumulated melt. This CO is released from the melt with a temperature equal to the temperature of the melt. This hot CO is further oxidized to $CO_2$ above the melt, inside or above the residual preheated but not yet melted solid charge. Therefore, this iron-carbon melt oxidation provides for heating up the melt and later for the heating of the residual solid charge. This CO to $CO_2$ oxidation releases about two-thirds of the additional heat to be released by the complete oxidation of carbon. While hot CO is passing throughout the solid charge, it also protects the solid iron from oxidation.

The specific characteristics of solid pig or DRI material is related to their behavior when contacted by hot oxidizing gases. The low (relative to steel scrap) melting point and high Si, Mn and carbon content cause the rapid slagging of solid pig iron when it is heated in an oxidizing furnace atmosphere, thus preventing the hot solid iron pieces located in the central zone of the furnace from igniting and rapid oxidizing. The high porosity, high $SiO_2$ content, low thermal conductivity of DRI, as well as the low gas penetrability of the DRI pile, make rapid heating and melting of this material very difficult. This makes it desirable to arrange the rapid initial preheating and melting of pig iron and DRI material in such a way that the solid material is well protected from oxidation by the use of carbonaceous fuels as described above. Also, during the later stage of the melting and refining, the residual iron scrap will be protected by hot CO, which is generated during the oxidation of the solid carbon and the iron-carbon melt.

To make the initial stage of solid iron melting short and rapid, this method uses an initial preheating stage wherein a solid ferrous material charge consisting of light steel scrap and solid iron is preheated prior to melting down. During the charging of said ferrous metallic charge, the first steel scrap charge is charged to provide for good penetrability of gases and could be optionally preheated utilizing techniques similar to those described above, including the charging of two carbonaceous materials. The use of hot residual slag from the previous heat and the charging of slag forming material into the furnace to increase the basicity of altered slag above 2.0 (and preferably above 3.0) prior to charging said light steel scrap is preferable. After said first solid ferrous metallic material charge is preheated, additional ferrous material consisting primarily of solid pig iron and/or DRI is charged on the top of said first metallic charge. This is followed with an additional final solid metallic charge (consisting primarily of steel scrap) placed on the top of said solid iron charge. After this charging, a step of preheating should be conducted by introducing an oxidizing gas by top lance means and by continual charging of carbonaceous materials on the top of said additional charge. After said additional steel scrap charge is preheated, the oxidizing gas flow is preferably increased to ignite and to burn a fraction of said steel scrap located inside of the central zone of the furnace located along central axis of the furnace when BOF convertor is used. Burning steel scrap inside the central zone of the furnace results in a rapid temperature increase in the central zone and formation of hot (above 1500° C.) stream of molten iron-carbon materials including iron oxides. This stream of hot molten ferrous materials runs down on and melts solid pig iron, which has a lower melting point (below 120° C.) than the temperature of said hot molten material. While the overheated iron-carbon melt containing molten iron and said hot molten ferrous materials are being collected at the bottom of the furnace, the iron oxides are further reacting with solid carbonaceous material and with silicon in the molten iron. This oxidation of silicon releases additional heat which is responsible for further overheating of the iron-carbon melt. It is very important, during this period of time, due to the above-described method of scrap charging, that the first optionally preheated steel scrap charge, which has a higher melting point than said hot iron-carbon melt, plays the role of a slowly dissolvable separating buffer. This buffer allows the molten material for an appreciable amount of time to run through the solid pig iron scrap and/or DRI without allowing the pig iron scrap or DRI to collapse the buffer and to get into molten pool. An additional source of heat is provided inside of said separating buffer zone during this period of time by reaction of the oxidizing gas, being supplied by the top oxygen lance and penetrating inside of the residual not yet melted solid charge, with hot CO which is generated by the oxidation of the solid carbonaceous material and iron-carbon melt at the bottom of the furnace.

It is necessary to arrange the melting of pig iron or DRI material in such a way that solid metallic material is well protected from oxidation during the preheating cycle. Also, during the later stages of melting and refining, the residual iron scrap should be protected by hot CO, which is generated during the melt oxidation of the iron-carbon melt. The initial stage of the solid metallic charge preheating should be conducted by utilizing carbonaceous materials containing a large fraction of solid carbonaceous fuel rich with easily volatized hydrocarbons (long flame coal and/or gas coal) in order to preheat the top part of the solid charge. Coke, anthracite or other solid carbonaceous materials containing low amounts of hydrocarbons should preferably be charged on the top of the hot thickened slag. This thickened slag should preferably be created by prior charging of the slag forming material (for example lime) on the top of the hot slag retained from the previous heat to provide for colder viscous high basicity thickened slag. This charge of solid carbonaceous material will create a CO generating layer under the scrap very early during the scrap preheating and melting cycles. This will protect the solid metallic part of the charge from oxidation during the substantial part of the entire melting-down cycle, especially after the solid charge temperature exceeds 700° C. and the volatilization of newly charged hydrocarbons greatly accelerates. When the solid metallic charge is preheated to such conditions, the majority of these hydrocarbons leave the solid carbon pieces charged on the top of the scrap before the pieces reach the lower part of the furnace. As already discussed, the earlier formation of hot thickened slag with high basicity is also advantageous to prolong the refining of the iron-carbon melt, especially from phosphorus and sulfur.

When pig iron and DRI scrap is processed by the method described above in a furnace equipped with electric arc, plasma or other heat sources which utilize electric energy, the need to charge said top final portion of steel scrap to be consumed by burning can be significantly reduced by the use of auxiliary electric energy for the melting of the solid metallic charge.

Due to the substantially larger fraction of heat release occurring inside of the iron-carbon melt during the final stage of melting and refining than above the melt, an injection of non-oxidizing gas into the melt is highly recommended for the enhancement of heat and mass exchange, especially when a ferrous charge comprising mainly pig iron or DRI is processed or when heavy pit steel scrap is charged near the bottom of the furnace.

The above described processes should be further modified when liquid hot iron or other liquid ferrous metallic material is available for steelmaking in an amount up to approximately 80% of the entire ferrous metallic material to be charged. The modified embodiments of this invention may be practiced to allow the processing of additional solid ferrous metallic material consisting, at least partially, of scrap with the use of one or more liquid metal charging steps. When solid steel ferrous metallic material begins to exceed approximately 20% of the entire charge of ferrous metallic material, the heat provided by the oxidation of carbon, silicon and manganese in liquid ferrous metallic material may become insufficient for the steelmaking process. This creates a requirement for additional heat input into the process. This additional heat input is provided in conventional BOF practice by the additional oxidation of Fe of hot iron. The cost of hot iron is typically higher than steel scrap, but the heat of carbonaceous fuel combustion is the least expensive heat that is used in the steelmaking process. Therefore, these modified embodiments rely on the use of an additional amount of heat to be released by burning of carbonaceous material and preheated steel scrap that is similar to the described above modifications of the present invention which do not utilize hot iron or other liquid ferrous metallic material.

The level of additional heat to be released by each of these methods depends on the relative mass of solid ferrous materials to be processed with liquid ferrous metallic material. When more than approximately 60% of the ferrous metallic material is charged as a liquid metal, the liquid metal should be charged on the top of a solid (optionally preheated) ferrous material that contains steel scrap. When less than 50% of ferrous material is charged as liquid metal, the solid ferrous material should always be preheated prior to liquid metal charging. When such initial solid ferrous material preheating takes place, the solid portion of ferrous metallic material should be preferably charged on the top of the slag retained from the previous heat. This slag should be preferably previously thickened with a top charge of slag forming material, increasing slag basicity and reducing slag temperature and fluidity. While retention of slag is not mandatory in other cases, it is very advisable in cases when less than 70% of ferrous material is charged as hot iron or as other liquid ferrous metallic charge.

These embodiments differ from the earlier described method in three ways. First, the placement of a first charge of carbonaceous materials prior to the charging of metallic scrap is not recommended when initial preheating is not conducted because the pouring of hot iron on top of the carbonaceous charge may cause a dangerous reaction when a significant amount of the carbon already contained in the hot iron is delivered with molten charge under the solid scrap pile as soon as charging of hot iron is carried out. This could result in rapid oxidation of iron carbon and therefore in rapid generation of significant amount of CO which could cause a vigorous ejection of slag and scrap from the furnace.

Second, the heat of hot iron or other liquid metallic charge is used to accomplish the solid charge preheating, with or without the initial preheating of this solid charge with the use of top charged carbonaceous materials. This initial preheating utilizes the above-described method of using top charged carbonaceous materials and oxidizing gas lancing. After the charging of hot iron, the ignition of the preheated steel scrap and the pool of hot iron is initiated by lancing an appropriate flow of oxygen by the top lance positioned above the top of the central zone of the furnace containing the preheated charge. Carbonaceous material preferably should be continually top charged during the burning stage following said ignition.

A third difference of these embodiments relates to slag forming and handling. The use of a significant amount of hot iron leads to rapid oxidation of silicon with hot iron oxides formed after the ignition of preheated steel scrap. This results in the reduction of hot iron oxide (provided by the burning of the preheated solid metallic charge) to iron by reaction with silicon and other reducing elements in the hot iron, thus preventing metallic yield losses due to the burning of the steel scrap. It also results in earlier formation of a large volume of slag on the top of the iron-carbon melt. In many cases an excessive amount of this slag may make it necessary to do intermediate deslagging prior to the end of the refining step. Depending on the amount of hot metal charged and the grade of steel to be produced, intermediate deslagging may be desirable to reduce the amount of slag present in the furnace prior to the end of the charging of slag forming material for refining. This deslagging is also needed at lower temperatures to remove phosphorous in case the hot iron or other used liquid ferrous material contains an appreciable amount of phosphorus.

In cases when conventional source of liquid ferrous metallic charge (for example the blast furnace iron) can not deliver adequate amount of liquid ferrous metallic material for production of steel, the intermediate liquid ferrous metallic semi-product can be produced to play the role of liquid ferrous metallic charge as described in a fifth embodiment of this invention. This fifth embodiment utilizes the modified steelmaking method using solid and liquid ferrous metallic materials and the heat of auxiliary fuel combustion with oxidizing gas to preheat solid ferrous metallic charge. The use of this modification includes a step of producing and tapping of initial molten ferrous metallic product (preferably steel) into the ladle, a step of charging additional material or materials capable of increasing the content of non-ferrous oxidizable components and of reducing the oxygen content in said initial molten metallic product by converting this molten product to an intermediate liquid ferrous metallic semi-product having an increased content of oxidizable non-ferrous components such as preferably carbon, silicon, manganese, aluminum or a combination of the above, a step of charging of said intermediate semi-product into the steel making furnace to produce steel with the use of a substantial portion of solid ferrous metallic material, a step of preheating of said solid metallic material with the use of auxiliary heat preferably produced by combustion of solid carbonaceous material including volatile hydrocarbons with oxidizing gas.

DESCRIPTION OF THE PREFERRED EMBODIMENTS

The preferred embodiments of this invention will be described with reference to steel making furnaces melting ferrous metallic material and using a solid ferrous metallic charge of up to 100 percent. Six process modifications will be described in detail. The first process modification utilizes a charge of 100% solid metallic charge comprising primarily steel scrap. The second process modification utilizes a 100% solid metallic charge comprising primarily of pig iron and/or DRI. The third process modification utilizes a ferrous metallic charge consisting of at least 10% liquid ferrous metallic material in addition to a solid metallic charge containing steel scrap. Detailed descriptions of these methods will follow hereafter in the sequence of the key operations required to accomplish the steel producing cycle.

The fourth embodiment of this invention utilizes an additional electrical energy source to melt and superheat a ferrous metallic charge. The fifth embodiment utilizes a ladle treatment to produce an intermediate liquid ferrous semi-product for use with solid ferrous metallic material to produce steel.

A. First Process Embodiment (100% Steel Scrap).

Figure 1:
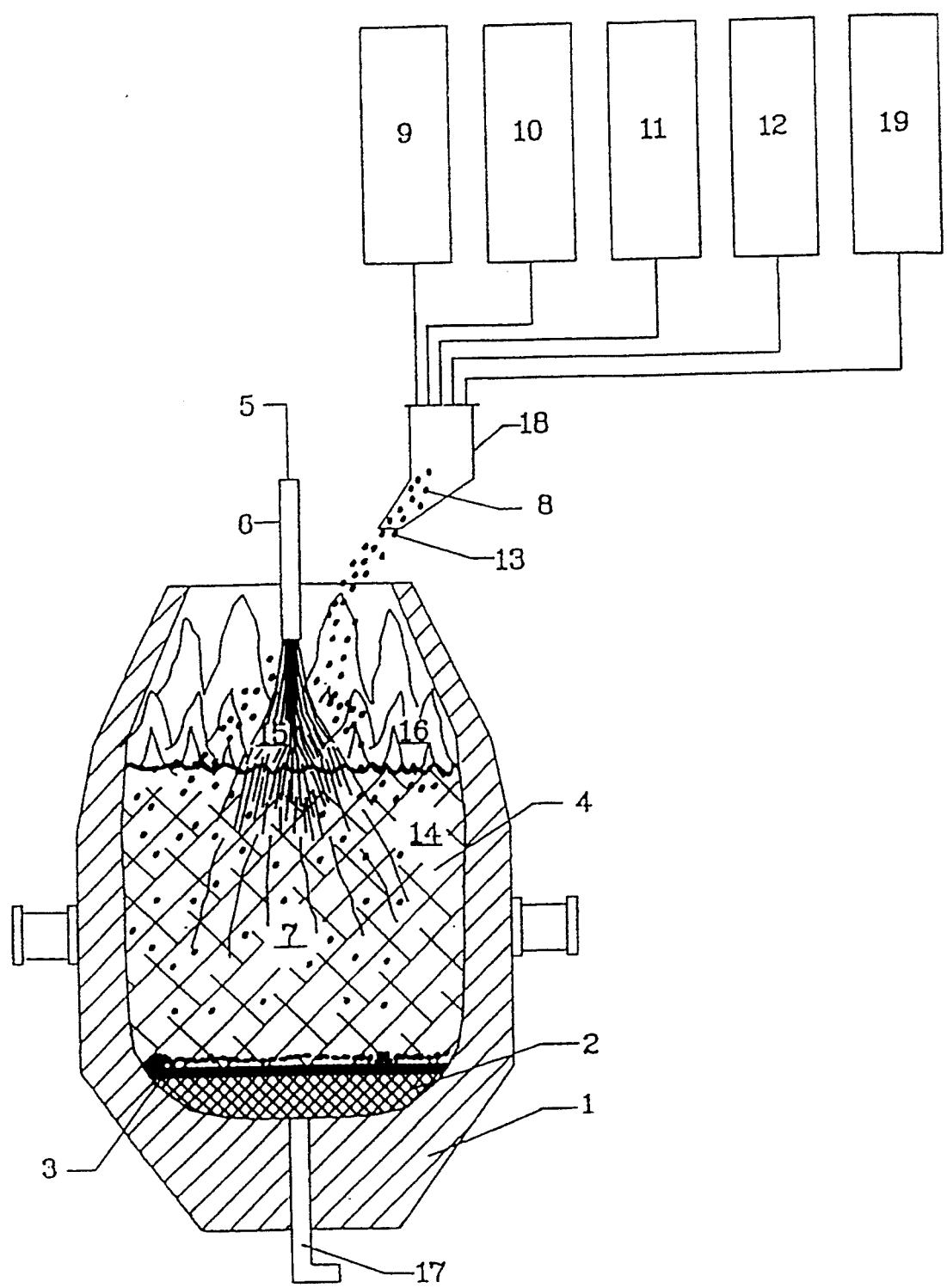
FIG. 1 is a schematic view of a cross-section of a BOF vessel and its charges illustrating a first embodiment of the invention.

The first embodiment of the present invention as practiced in a conventional BOF furnace is illustrated in FIG. 1. First, slag forming material (for example, lime) is first charged from bunker 9 into the BOF furnace 1. This slag forming material is charged in an amount of 40-80% of the total amount of slag forming material necessary to be used for a given heat. This recommended amount should enhance the refining capabilities of the slag 2 to be retained from the previous heat by increasing the slag basicity and viscosity through its alteration. A slag basicity of not less than 2.0, and preferably above 3.0 should be provided by this altered charge of slag forming material. The residual portion of the slag from a previous heat is maintained hot in the furnace prior to the charging of slag forming materials. Hot slag from the previous heat is retained in order to provide the additional heat for new altered thickened slag formed at the bottom of the furnace prior to charging steel scrap and to prevent rapid cooling of the first fraction of molten material reaching the bottom of the furnace 1. The charging of slag forming material reduces the temperature of the residual slag and increases slag viscosity and basicity. The presence of iron and manganese oxides in the residual slag in a high quantity helps to dissolve the lime in slag at lower temperatures and prevents formation of a significant amount of dicalcium silicate having a very high melting temperature.

Second, a predetermined amount of first solid carbonaceous fuel material optionally (approximately 10–50 kg but more preferably less than 30 kg but more than 10 kg per ton of steel to be tapped) having low content of volatile hydrocarbons, such as coke or anthracite, is charged on the top of the first charge of slag forming material from bunker 10 forming carbonaceous layer 3.

Third, a charge of ferrous metallic materials is fed into the furnace in one or more charges to create a scrap pile 4. The ferrous metallic material comprises primarily steel scrap, up to 100% of the charge. This ferrous material should preferably be charged in multiple charges. The first portion of ferrous material is to be fed on the top of the layer 3 of said previously charged first carbonaceous fuel material. This first portion should mainly comprise light-weight scrap in an amount of 5–25% of all metallic materials to be charged for a given heat. Light-weight scrap preferably is used to provide good penetration of gases.

Fourth, after said metallic charge is fed into the furnace, oxygen rich oxidizing gas is supplied from supply line 5 to be blown from above the charged materials through a movable top lancing means 6.

Additional second carbonaceous fuel material 8, including a carbonaceous fraction containing significant volatile hydrocarbon fractions (preferably more than 25% volatile hydrocarbons by mass) such as bituminous coal, long-flame coal and/or gas coal, is charged from a bunker 11 on the top of said metallic charge 4 prior to and/or during said oxygen blowing. This charging of additional second carbonaceous fuel is conducted continually in such a way that a significant accumulation in the furnace of the unburned volatile hydrocarbons contained in this material is prevented. This should be done to eliminate future excessive instant releases of unburned hydrocarbons that are dangerous to the safety of operations and the environment. Preferably this additional carbonaceous fuel material also includes another carbonaceous fraction 13 containing a low amount of hydrocarbons (preferably less than 5%) such as coke or anthracite coal and supplied from a bunker 12 which may be comprised of smaller pieces that the material supplied from bunker 11. The charging means 18 to be used to feed said additional carbonaceous material should preferably provide control over the weight of each such charged fraction (and, therefore, the control over shares of carbon and hydrocarbon delivered with carboneous materials) and also for even distribution of charged carbonaceous material on the top of said metallic charge. The flow of the oxidizing gas should be introduced with movable lance means 6 and should be controlled by the operator manually and/or by a computerized control system. The direction of oxygen flow toward said metallic charge should also be controlled by the movement of this lance so that the major part of said oxidizing gas is directed (preferably with a virtually movable multi-hole top lance) toward the central zone 7 of the furnace, located far from the furnace side walls and along the central axis of the furnace when BOF converter is used. To accomplish such introduction of oxygen the appropriate movement of the lance should be provided during the entire steel making process.

When said charges are initially placed in the furnace, the furnace should be hot from the previous heat so that heat transfer from the hot refractory lining and the residual slag can take place to preheat said carbonaceous material and to provide for the initial volatilization of combustible gases containing volatile hydrocarbons. These volatile combustible gases penetrate through the steel scrap pile due to the negative pressure created above the scrap pile by the flue gas evacuation system of the furnace.

As soon as the oxidizing gas blowing is initiated, the oxygen rich oxidizing gas is directed to mix with combustible gases containing volatilized hydrocarbons and other combustibles. The oxidizing gas first enters in the furnace at an afterburning region 15 located at the oxygen lance working end and above the portion of solid charge pile located in the central zone of the furnace. This afterburning region 15 is oxygen rich due to the excessive presence of oxygen provided with said oxidizing gas, the flow of which is controlled to provide for oxygen delivery that is instantly needed for steel making purposes. Therefore, this first consumption region of lanced oxygen provides good conditions for burning of combustible gases emitted from the scrap pile. The excessive oxygen presence in this region does not impact negatively the metallic yield loss because of the very limited contact of the oxygen rich combustion mixture with the top of the metallic charge located in the peripheral zone 14 of the furnace. The heat released at the top and above the scrap pile radiates toward the scrap pile and preheats the metal and the carbonaceous material which has been charged on the top of the scrap pile.

After the lanced oxygen is partially consumed in said afterburning region 15, the stream containing the rest of the oxygen further penetrates inside of the metallic charge 4, wherein the oxygen mainly reacts with combustible volatilized components of the carbonaceous materials during the initial stage of cold solid charge preheating and with the hot carbon surface of said carbonaceous material after the solid charge is partially preheated. It should be understood that after having been charged on the top of the metallic charge, these carbonaceous materials have also penetrated into the pile through openings between pieces of the metallic charge. The heat released inside of the flame 16 located inside and above the metallic pile provides for rapid preheating and partial melting of the lighter fraction of the metallic charge and preheating to a lower temperature the heavy pieces having a higher mass to surface area ratio.

Because the major amount of oxygen is directed toward said central zone 7 of the furnace, this zone receives the major fraction of heat being released by oxidation of volatilized combustibles and, therefore, has the highest temperature. The volume of the furnace occupied by metallic material outside of this central zone receives less unconsumed oxygen and, therefore, maintains more reducing and colder conditions during oxygen blowing. The oxygen penetrates into the peripheral zone 14 of the scrap pile surrounding said central furnace zone 7 due to the positive pressure of oxygen rich oxidizing gases. This pressure is formed when a high velocity stream of oxidizing gases penetrates inside of the scrap pile. This oxygen supply is responsible for the combustion of hydrocarbon, CO, $H_2$ and other combustibles inside the peripheral zone of the furnace.

Consequently, the second oxygen consuming central furnace zone 7 receives less oxygen due to its partial consumption inside of the first afterburning zone 15.

The final, third stage of reaction of lanced oxygen takes place in the furnace space 14 surrounding the central furnace zone. The concentration of oxygen in this peripheral zone 14 is the lowest, but the concentration of combustible gases is the highest. This creates good reducing conditions for scrap preheating inside of this zone without any substantial yield loss due to oxidation of metal. Because the volume of metal occupying the surrounding zone is much greater than the volume of metal located in central zone, the overall oxidation of metal is minimized. A substantial role in this protection is first played by the volatilized hydrocarbons supplied by long flame coal, bituminous coal and/or gas coal during the initial oxygen blowing and, further, when the estimated average scrap temperature is raised above 700° C., by CO generated due to the oxidation of the residual carbon of flame coal, bituminous coal and/or gas coal and due to the oxidation of carbon contained in coke and/or anthracite, which has been charged continually on the top of the pile and which has been initially charged as a part of said second solid charge on the top of the slag forming material.

During the later stage of this scrap preheating step of a steel making process, an additional solid ferrous metallic charge or charges are charged into the furnace. The additional carbonaceous material in the amount of approximately 25 kg per ton of charged additional solid metallic charge are charged continually on the top of said additional solid ferrous charges following said additional charges to provide an additional source of hydrocarbons and solid carbon, while additional oxygen blowing via the top lance 6 is performed, maintaining the flow which provides for about stoichiometric conditions for complete combustion of said additional carbonaceous material, to preheat said additional metallic charges.

During this later stage of the preheating cycle some light scrap may be melted down and collected at the bottom of the furnace. Initially, oxidized iron-carbon melt runs down throughout the carbonaceous layer 3 of coke and/or anthracite, which has been previously charged on the top of the slag forming material. The early reaction between the carbon layer and metallic oxides or molten metal helps to accomplish continuous carburizing of the melt and reducing of some of the metallic oxides. At the same time, early refining of the molten ferrous material is initiated by reaction of the iron-carbon melt with the high basicity slag being collected on the top of the slag 2 located on the bottom of the furnace.

During preheating of the charged metallic materials the differential temperature between the charged materials and the combustion products contacting these materials decreases gradually. This slows down the heat transfer rate and efficiency. In order to accelerate heat transfer and to provide for a short melting down cycle, the fraction of preheated solid steel scrap located in the central zone of the furnace is ignited. This igniting step preferably takes place after at least 50% of the charged volatile hydrocarbons is consumed and the estimated average scrap temperature reaches about 500°–700° C.

To support rapid oxidation of a fraction of said preheated scrap, the oxygen lancing flow is increased to the level at which the presence of CO, $H_2$ and hydrocarbons in the central zone of the furnace is no longer sufficient to protect the surface of steel from rapid reaction with concentrated oxygen. The reaction of oxygen with the hot steel surface releases highly concentrated heat and raises the temperature of oxides formed on the surface of the steel pieces. Such heat of surface oxidation is transferred very rapidly by the thermal conductivity of steel inside this material. This speeds up the melting process of metallic pieces which are involved in such oxidization and, at the same time, directs a powerful heat flux to the surrounding scrap. The hot ferrous oxides then run down toward the small pool of earlier formed iron-carbon melt being accumulated at the bottom of the furnace, where these hot oxides first react with the layer of carbonaceous fuel material located on the top of the iron-carbon melt. In addition, this increased flow of oxidizing gas provides a stronger stream of oxidizing gas capable of reaching said accumulated melt and solid carbonaceous material located on the top of the melt. This further enhances the heat release, which is responsible for melt superheating and melting of scrap that is submerged into the melt. This also increases the rate of CO generation and flow of hot CO moving up through the residual scrap.

When the lower portion of the solid steel scrap that was initially submerged in the iron-carbon melt is substantially melted down, the temperature of the melt increases. This provides conditions for a thickened high basicity slag (which was initially positioned on the bottom of the furnace) to participate more actively in the refining of an iron-carbon melt while still being located under the melt. This also provides conditions for the slag then to float up and change its position so that it now is located on the top of the iron-carbon melt.

Such floatation of the high basicity slag fraction takes place gradually with the melting of the lower portion of solid steel scrap pieces initially resting on the top of the thickened slag. This movement improves the mass exchange between the slag material and the iron-carbon melt and further speeds up dephosphorizing and desulfurizing of the melt. When a hot slag layer is established above the iron-carbon melt, the endothermic reaction of iron oxides and solid carbonaceous material positioned on the top of the melt is still taking place. The amount of heat consumed by this endothermic reaction is not capable of cooling the hot slag layer significantly and slowing down the refining pace due to the simultaneous heat release which is generated via the exothermic reactions of oxidation of the carbonaceous layer 3 with the top blown oxygen. This creates a strong positive heat balance that is responsible for the continuous heating of the iron-carbon melt during this portion of the steel making cycle.

Furthermore, the oxygen flow is capable of penetrating through the hot fluid slag layer to contact the iron-carbon melt and to provide for additional heat by oxidation of carbon and other components of the melt. This provides for further overheating of the iron-carbon melt.

Preferably, both types of carbonaceous fuel materials should be charged during the entire melting cycle in order to maintain the desired balance of hydrocarbons and solid carbon provided with both fuels on the top of and inside the scrap pile and in order to maintain the desired balance of coke and/or anthracite in said carbonaceous layer and, later, inside of the slag. Preferably, the larger fraction of carbonaceous fuel containing volatile components of hydrocarbons should be charged during the initial colder part of preheating.

The control over the heat balance during the entire melting cycle and also the control over the heat and carbon mass balance responsible for the reducing capability of the solid layer of carbonaceous mateheidel (which is initially located on the top of the slag forming material and, later, on the top of and inside of the slag) is maintained by controlling the initial charge of carbonaceous material and, further, the charging pace of said additional two different carbonaceous materials and also by continuously controlling the oxygen introduction into the process, preferably via the top oxygen lance. This continuous control over oxygen introduction should preferably be carried out not only by controlling the oxidizing gas flow but also by controlling the optimum position of the movable lancing means. In some cases, it is also advisable to control the oxygen concentration of oxygen rich oxidizing gas by using compressed air and oxygen as components of said oxidizing gas and by controlling their ratio during the steel making cycle. In such case, some compressed air may be used to prevent the local melting of scrap during the initial preheating and to cool down the temperature in the furnace when needed.

In order to maintain continual heating of the melt and solid materials above the melt and to control the slag oxidation capacity and volume, the controllable charging of said additional carbonaceous materials, containing low volatile hydrocarbons e.g., such as coke and anthracite, is preferred during the time interval occurring between 10-90 percent of the oxygen lancing period.

Near the end of the oxygen lancing period, when the refining cycle is near completion, the carbon content of the melt becomes low and the amount of iron oxides in the slag increases. In order to reduce the losses of metal with the slag, as well as to reduce the oxygen level in the melt, it may be beneficial to remove 60 to 80 percent of the slag near the end of the oxygen blowing period and, after that, to complete the blowing, charging additional carbon and/or manganese containing materials from bunker 19.

The amount of slag to be removed is determined by the objectives of retaining slag for the subsequent heat, the cost of energy to be used for heating extra slag, the savings provided with reduction of metal loss, and the improvement of thermal efficiency of carbonaceous fuel combustion within a furnace having hot slag on the bottom.

Adding solid carbonaceous material, during the oxygen lancing period after deslagging, not only enhances melt heating, but also allows for a partial diffusion of reduced manganese from the slag in the melt and reduces the steel oxygen level by the tapping time.

Blowing non-oxidizing, inert gas, for example, nitrogen or argon, through the bottom tuyere 17 improves the iron-carbon melt refining and reduces steel oxidation during the final stage of refining.

The amount of carbonaceous fuel material used to practice the above-described embodiment depends on the steel scrap characteristics and furnace design and dimensions, and could preferably be varied between 40 and 80 kg/ton of liquid metal produced.

When the above-described process is conducted in a furnace equipped with an auxiliary electric energy source, such as electric arc or plasma, this process should also include the introduction of electric energy during the final part of scrap preheating and/or melting and ferrous melt superheating.

B. Second Process Embodiment (Up to 90% of Solid Iron).

The second embodiment of the invention relates to a method of producing steel from a metallic charge mainly comprising solid pig iron and/or direct reduced iron (DRI) in form of pellets, lumps, or briquettes. Initial melting of pig iron and/or DRI is done using high temperature heat generated by burning two carbonaceous fuels and a part of preheated steel scrap, which in many aspects is similar to the method of melting steel scrap described above.

In general, a number of exothermic reactions related to coal burning, oxidation of steel scrap and oxidation of pig iron or DRI by the oxygen may potentially release a large amount of heat. The main difficulties preventing the use of first process embodiment described above for the melting of a solid charge primarily containing pig iron or DRI arises from the behavior of the hot solid surfaces of such materials when contacted by oxygen. The rate of solid pig iron and DRI oxidation does not allow a sustainable burning of these solid materials by oxygen due to surface slagging even after they are preheated in the reducing atmosphere. This necessitates the use of the second steel making process embodiment.

Figure 2:
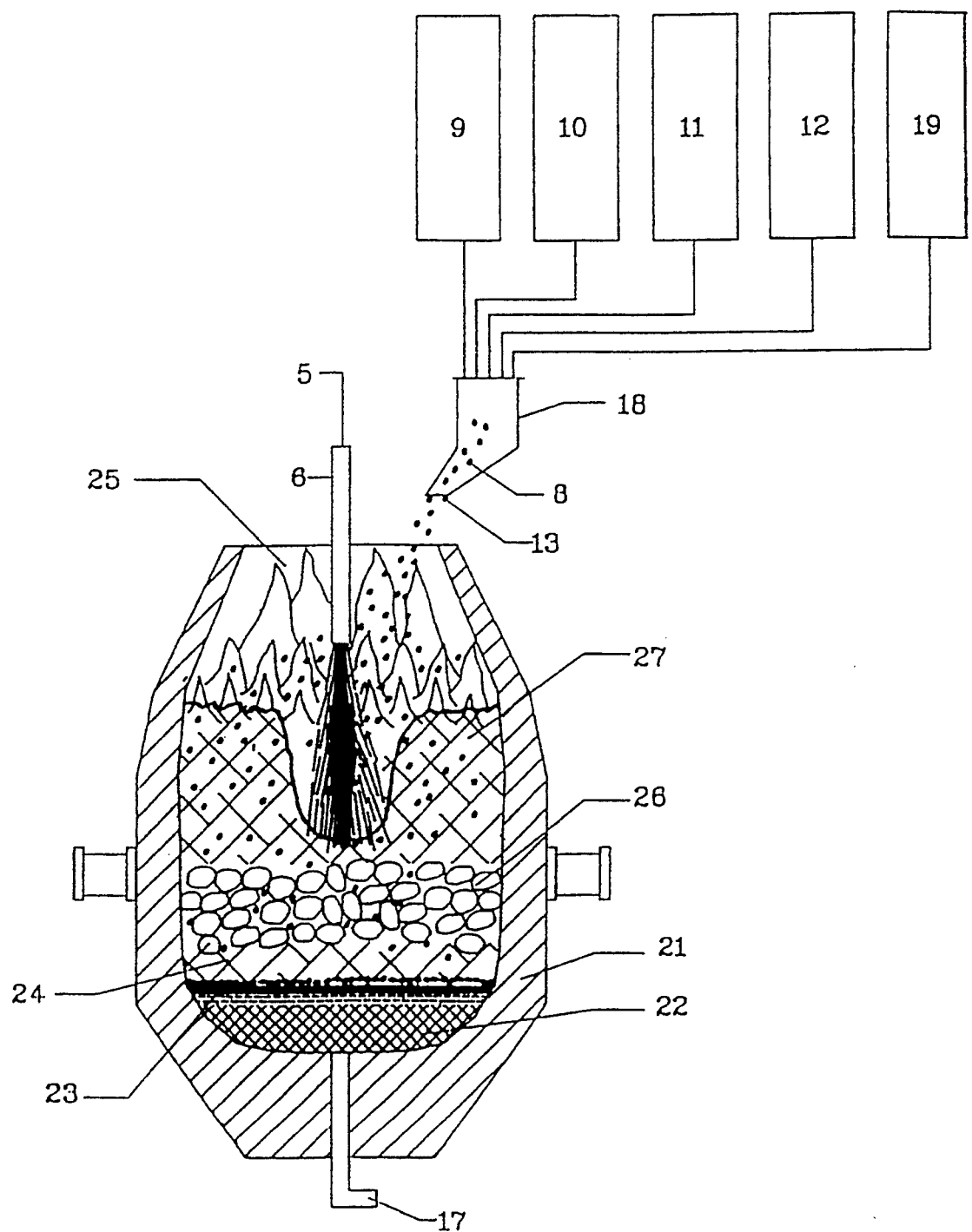
FIG. 2 is a schematic view of a cross-section of a BOF vessel and it charges illustrating a second embodiment of the invention.

This second method of producing steel is illustrated in FIG. 2 and comprises of multiple operation steps.

First, a slag forming material 22 is charged in furnace 21 to alter the portion of slag retained from the previous heat in order to increase slag basicity above 2.0, and preferably above 3.0. Then solid carbonaceous material containing low levels of volatile hydrocarbons is charged, similar to that described in the first embodiment of this invention.

Second, after a solid carbonaceous layer 23 is formed on the top of the thickened slag, a first steel scrap charge 24 is loaded through the furnace opening 25. After this first steel scrap is charged, it could be optionally preheated utilizing a method of preheating similar to that described above in the first embodiment of the invention.

Then, the charge of solid pig iron and/or DRI 26 is loaded. Next, the remaining steel scrap 27 is loaded on top of the solid iron charge 26 so that the entire charge of solid iron is positioned on the top of the first steel scrap charge 24 and under the second steel scrap charge 27. To ensure the highest effectiveness of the process, the charged steel scrap must be lightweight, with a preferable load density 0.4–1.0 t/m$^3$ for the first charge and 0.3–0.7 t/m$^3$ for the second one. The preheating cycle should then be initiated and conducted to the point that the top of the second scrap pile is preheated above approximately 800° C.

After the second steel scrap charge is preheated to the estimated average temperature of approximately 500°–700° C. utilizing the above-described scrap preheating method, ignition of the portion of the second steel scrap located in the central zone of the furnace is initiated. When burning of said portion of the preheated steel scrap takes place, a hot product consisting of ferrous oxides and molten metallic droplets runs down from the top part of the steel scrap pile. These droplets are overheated up to at least the steel melting temperature of approximately 1,500° C. This hot molten stream causes the melting of the solid pig iron and/or DRI placed below the scrap steel being burned.

To ensure effective heating and melting of the steel scrap, the method requires certain conditions of oxidizing gas lancing and for the supply of carbon-containing materials into the furnace depending on the stage of the process.

Two kinds of carbonaceous solid fuel are utilized in this embodiment, similar to those utilized in the first embodiment of this invention. Anthracite or coke is first charged, before the charging of the solid ferrous metallic charge, in amounts of 5 to 12 kg/ton of iron and steel scrap and iron charge positioned on the top of the thickened slag. A further carbonaceous charge should follow the loading of the second lightweight steel scrap and pig iron and/or DRI. Prior to and/or during the first 3-6 minutes of oxidizing gas lancing in the furnace, an additional 20 to 50 kg of gas or long-burning or bituminous coal per ton of charged scrap and 15 to 50 kg of anthracite or coke per ton of charged scrap is charged into the furnace to preheat the first charge of steel scrap.

The rate and the amount of the bituminous, gas or long-burning coal added at the beginning of the oxygen lancing should be chosen with consideration of the necessity of forming a high temperature reducing gaseous stream to preheat the steel scrap charge and the furnace lining. This helps to avoid the formation of hard-melting solid pig iron deposits on the side lining of the furnace and helps to accelerate the further ignition of the melt, which is conducted after the preheating of the second top portion of steel scrap is accomplished.

After the preliminary optional preheating of the first portion of the metallic charge is completed, the rest of the ferrous metallic materials are loaded as described above and the charging of the gas or long-burning coal begins, to preheat the second steel charge placed on the top of the solid iron. The intensity of the oxygen feeding preferably should be sustained at a level of 0.8 to 2.5 $m^3$ per minute, per ton of charge until between 7 and 25 kg of long-flame and/or gas coal is charged per ton of steel scrap contained in the second charge. In the volume of scrap occupied with the hot gaseous stream that is formed by the burning of volatilized hydrocarbons of coal, the process of partial melting in the central zone of the furnace of the lightweight steel scrap loaded with the last portion of the metallic charge begins. The hot molten material containing iron-carbon melt and iron oxides runs down throughout the solid iron charge. This provides for the initial melting of the solid pig iron situated on the top of said optionally preheated first steel scrap charge.

The amounts of added gas, bituminous and/or long-burning coals, the intensity of oxygen lancing, and the length of lancing the second steel charge are determined considering the necessity to generate enough heat to melt scrap rapidly to provide an initial iron-carbon melt and then to ignite the melt.

Anthracite initially charged on the top of the retained slag located at the bottom of the converter, as well as carbonaceous material remaining on the surface of the first portion of the charge, interact with iron oxides, thus reducing them. The resulting hot carbon monoxide penetrates the solid pig iron and/or DRI and heats it further, while the formed reducing gas prevents the remaining iron surface from oxidation and therefore slagging. Carbon in the anthracite is also consumed to carbonize the melt.

As a result, during the entire period of melting there is high temperature iron-carbon melt accumulated at the furnace bottom, and a portion of steel scrap of the first charge becomes initially submerged and finally dissolved in the melt.

The refining of the resulting iron-carbon melt is done by traditional methods utilizing top oxygen blowing while anthracite or coal is added continually into the furnace in amounts of 10 to 25 kg per ton of entire metallic charge after ignition of the melt. This carbonaceous material is partially used for the regulation of slag oxidation and the slag level in the furnace.

C. Third Process Embodiment (Utilizing Less Than 80% of Hot Iron).

Some of the innovative techniques of this invention discussed above for the first and second embodiments should be modified when utilized in this third embodiment. The amount of heat released by oxidation of solid carbonaceous fuels, carbon of the iron-carbon melt and Fe of the solid steel scrap will be varied in this embodiment depending on the ratio of the mass of hot iron to the mass of solid ferrous material in charge. Limitations on the heat that can be delivered by the initial preheating of the solid charge depends on its total mass, and, therefore, the reduction of this mass will shift the heat balance toward greater use of the heat to be released from oxidation of the iron-carbon melt and less use of heat to be produced by oxidation of solid carbonaceous fuels and steel scrap.

For the production of a majority of steel grades it is desirable when this third embodiment is used to retain hot high basicity slag from the previous heat in a steel making furnace. Addition of slag-forming materials, for example lime, in a quantity of 20 to 40 kg per ton of total metallic charge further increases basicity and reduces slag temperature and fluidity and, therefore, thickens the slag retained from the previous heat. The presence of such thickened slag earlier in the process accelerates later on the process of silicon oxidation in the hot iron-carbon melt by the iron oxides present in the retained slag. This results in intensified heating of the iron-carbon melt and accelerates the steel scrap melting process above and inside the melt. The presence of high-basicity slag from the beginning of the oxygen blowing period also brings about favorable conditions for carrying through the processes of dephosphorizing and desulfurizing of the metallic bath.

Figure 3:
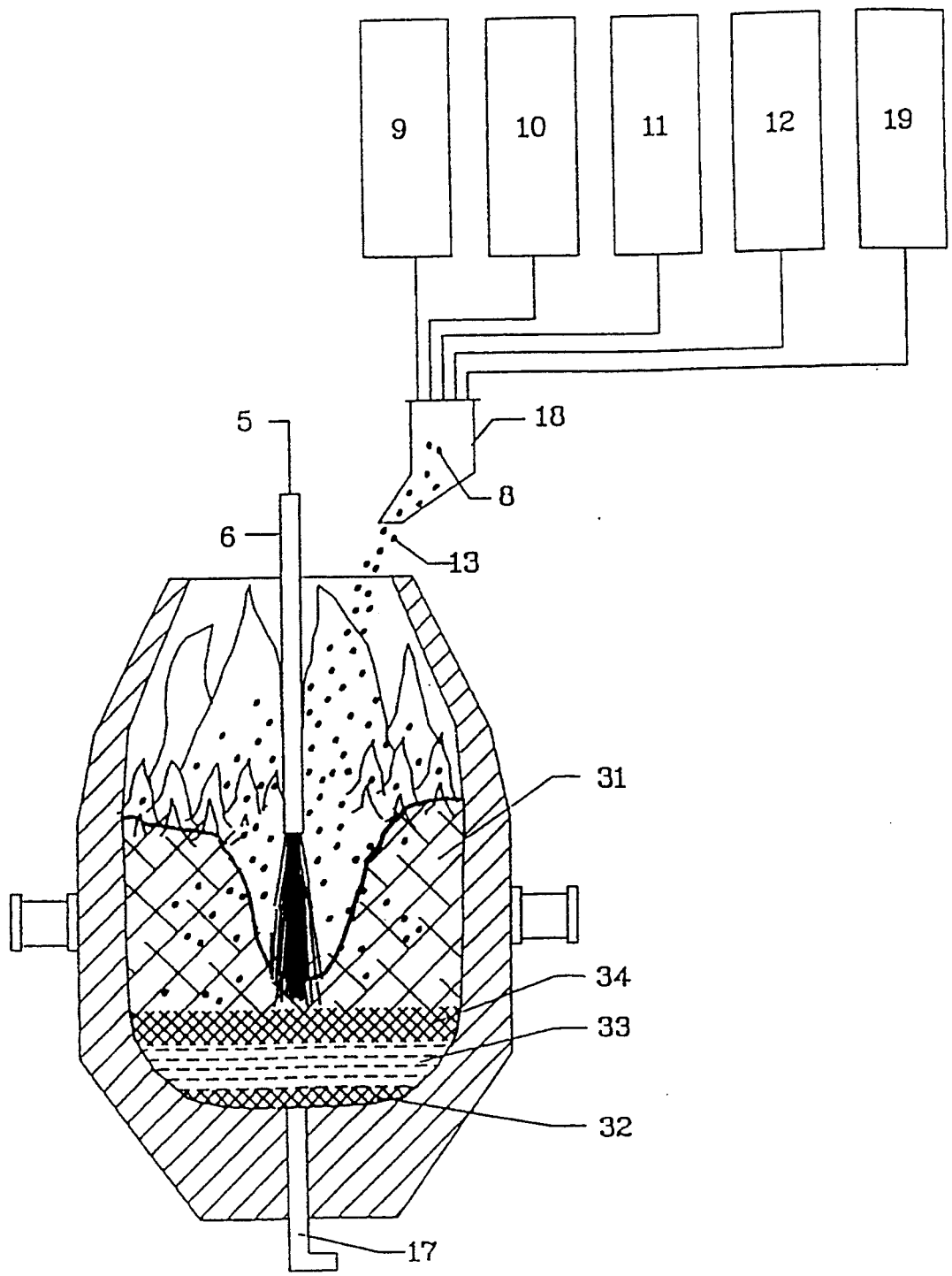
FIG. 3 is a schematic view of a cross-section of a BOF vessel and it charges illustrating a third embodiment of the invention.

The operation of this third embodiment of the invention is illustrated in FIG. 3. When this embodiment is used first, the charging of solid ferrous metallic material 31 is preferably conducted on top of the thickened high basicity slag 32. When the charging of hot iron 33 is carried out later on, it provides at least a part of the heat to preheat said solid metallic charge. In this embodiment of the invention the operator should know the approximate weight of molten hot iron which will be available for given heat. In cases when less 80% of the entire ferrous material is charged as molten iron, the operator may consider additional preheating of a solid ferrous material containing primarily steel scrap prior to or after the charging of hot iron. In cases where less than 50% of ferrous material is charged as hot iron, the operator should always conduct additional scrap preheating. The decision to conduct additional scrap preheating in the rest of the cases should be made based on economical considerations including the price of steel scrap and carbonaceous fuels, process time availability, grade of steel produced, and type of furnace utilized. The process of the additional scrap preheating by lancing top oxygen and top charging carbonaceous solid fuel should be conducted similar to that described earlier for the other embodiments.

After the charging of hot iron on the top of cold or preheated scrap is finished, the charging of solid carbonaceous material on the top of said solid ferrous metallic material is initiated. The lancing of oxygen rich oxidizing gas should be initiated (preferably simultaneously with or after initiation of said carbonaceous material charging), preferably using top oxygen lancing means which directs the oxidizing gas toward a portion of said solid ferrous material located inside the central zone of the steel making furnace. Charging of hot iron provides for rapid increase in the steel scrap temperature and creates better conditions for post combustion inside of the scrap pile CO stream which is generated by oxidation of iron-carbon melt. This provides for lesser and earlier oxidation when preheated solid ferrous metallic material is burned in the central zone of the furnace, thus improving the metallic yield when this third embodiment of the invention is used.

In cases where a steel making shop's logistics allow it to stage the process of hot metal charging, it is advantageous to charge the first portion of liquid metal on the top of the first (initial) solid ferrous metallic charge to initiate scrap preheating, and then to continue the scrap preheating step by combusting continually the top charged solid carbonaceous material with top blown oxygen, then to charge the second solid ferrous metallic charge which preferably consists of the rest of the solid ferrous metallic material to be used for given heat, and then to charge the rest of the liquid metal on the top of this second solid ferrous metallic charge to initiate this second charge preheating. The first solid scrap charge preferably comprises more than half of the total amount of solid ferrous metallic charge for a given heat. The first portion of liquid metal preferably includes more than half of the total amount of the liquid metallic charge, especially when hot iron is used as liquid metallic charge.

Although the charging sequence described above is recommended to increase metallic yield, several other sequences may be designed to utilize staged liquid ferrous metallic charging in combination with the charging of solid ferrous materials described in this invention, while using additional heat of combustion of top charged carbonaceous materials with oxidizing gas to preheat solid metallic charges in the manner similar to that described in this invention. The number of scrap preheating cycles can be varied based on the material handling logistics at the plant. The above described staged charging of liquid metallic charge would substantially improve the performance of the steel making process in many cases and is especially advantages when heavy scrap is used or when maximization of production rate is desired. Charging of hot iron after the first part of the solid scrap has been loaded provides for rapid preheating of the scrap, thus improving the ignition and combustion conditions and efficiency of the use of heat released by combustion of carbonaceous materials and by post-combustion of CO generated during oxidation of liquid metal at the bottom part of the furnace. The other important result of this type of preheating is an improved uniformity of preheating and higher degree of post combustion CO to $CO_2$ inside, at the top, and above the scrap pile. This intensified high temperature preheating of first metallic scrap charge will allow the BOF personnel to significantly increase the weight of the first and second solid metallic charges. Improved combustion of carbonaceous materials inside of the scrap pile will also intensify oxidation of sulfur bearing materials, thus preventing an increase in sulfur content in slag and in molten metal.

In cases when more than 50% Fe is charged with hot iron, a substantial amount of slag 34 is formed earlier when iron oxide and iron react with melt silicon. This creates a significant amount of slag on the top of the melt. In such cases, the oxidizing gas lancing initiated after hot iron charging should be provided for approximately 15-70% of the total lancing time to be used for entire heat. After this lancing is terminated, intermediate deslagging may take place, allowing discharging of between 40 and 80% of slag to be produced for entire heat. After intermediate deslagging, the lancing of oxidizing gas should be carried out again. The remainder of slag-forming material to be used for a given heat should be introduced, preferably simultaneously with the top charging of the carbonaceous solid material. The duration of such introduction should approximately equal to 15-70% of the total lancing duration to be conducted after said intermediate deslagging.

The above-recommended optional interim deslagging conducted after oxidation of the silicon in the hot metal leads to an increased refining ability of the slag with respect to phosphorus (due to a lower temperature of the discharged slag) as well as sulfur (due to a reduced activity of oxygen in the melt at the time of deslagging).

The amount of slag to be discharged is determined mainly by its quantity and the content of acid oxides, which, in turn, depends on the silicon content in the hot metal and scrap, as well as the degree of the scrap contamination with metallic impurities. High silicon content in the hot metal and scrap and large amounts of slag would require maximum deslagging, e.g. about 70%. Low silicon content in the hot metal and a small amount of slag would require a higher rate of retaining slag in the vessel, slagging off about 50% of it or less.

This third embodiment may also be carried out without the interim deslagging. In this case, 20 to 50% of the slag amount from the previous heat is retained in the furnace, thickened by adding a portion of slag-forming material, the rest of which is added after the charging of hot iron and partial melting of the scrap. This results in formation of the initial slag on the surface of the melt from a portion of the thickened, high basicity slag that flows up from the bottom of the furnace and of products of the oxidation of the melt impurities. Such initial slag is characterized by a higher degree of basicity, lower oxidation level, and higher temperature. Later adding of lime into a slag of this kind will not lead to the formation of dicalcium silicate. This results in considerable acceleration of the process of lime dissolution and improves the progress of melt refining.

The above-mentioned conditions of oxidizing gas lancing and the adding of carbon-containing and slag-forming materials into the furnace should take into full consideration the specifics of steel production with a high share of solid metallic charge in order to provide for optimization of the process with the best technological results. It is advisable, in many cases, to retain in the furnace 20 to 50% of the slag from the previous heat and, after charging the scrap and hot metal, to top charge 8 to 25 kg of solid carbonaceous fuel per tonne of metallic charge, not to perform the interim deslagging and, instead, add slag-forming materials during the time interval occurring between 25 to 35% of the total oxidizing gas lancing period accompanying said top charging of solid carbonaceous fuel.

Rapid preheating of the solid scrap with a hot iron charge results in a significant reduction of scrap preheating time in comparison with preheating cycles described in the first and second embodiments of this invention where hot iron charge is not utilized. This results in considerable acceleration of the scrap melting process. In turn, the presence of hot slag retained from the previous heat contributes to faster oxidation of silicon in hot melt, resulting in faster heating of the melt and scrap melting. The addition of slag-forming materials to the primary slag, which is characterized by rather high basicity and which is already attained by this time due to the presence of prepared slag on the bottom of the furnace, allows a high level of melt refining from sulfur and phosphorus. A significant advantage of this method is the fact that the combustion of top charged carbonaceous fuel occurs within the furnace prior to the formation of new additional slag, thus providing for removal of significant amount of sulfur in the gaseous phase. High refining efficiency allows a reduction in the quantity of slag-forming materials needed, decreases the amount of slag, and provides for the utilization of higher share of scrap in the metallic charge.

It is advisable to top charge continually additional carbon containing material in the range of 2 to 5 kg per ton of charge in approximately equal portions at approximately equal intervals during the time interval occurring between 65 to 85% of the entire period of oxidizing gas lancing. This results in a highly improved thermal efficiency of the steel making process by providing conditions which are more favorable for accomplishing more complete oxidation of the charged carbonaceous fuel and, at the same time, for providing a minimal oxidation of iron and minimal loss of heat during the endothermic reaction of oxidation of the melt's carbon by the oxides of iron in slag, as well as the optimization of metal refining with slag.

When less than 50% of ferrous metallic material is charged as hot iron and the initial scrap preheating is advisable, it is also preferable in such cases to charge scrap into the furnace in the several portions in quantities sized from $\frac{1}{4}$ to $\frac{3}{4}$ of the furnace's total volume and to heat each said portion for at least 2 minutes by combustion of at least 10 to 25 kg of long flame or gaseous coals per ton of charged scrap with oxygen supplied at a rate of at least 0.7 m$^3$/kg of charged coal.

When multiple steel charges are used and less than 50% of ferrous metallic material is charged as hot iron, it is advisable to repeat the process of preheating after charging the second and subsequent portions of solid scrap by utilizing gaseous or long flame coal at the rate of 10 to 15 kg per ton of scrap. This improves the uniform heating of the scrap and the uniform distribution of the unburned portions of coal within the solid charge, which later provides accelerated scrap melting.

Although the above described embodiment relies primarily on the exothermic energy of oxidation of melt carbon to superheat the melt and also to utilize part of this energy together with the heat of combustion of the carbonaceous fuel materials (primarily for the solid charge melting purposes), the economics of this embodiment may be suitable for use in modified electric arc furnace in cases when less than 50% of ferrous metallic material is charged as hot iron.

When the steel making furnace utilizing this embodiment is equipped with an electric energy source, such as electric arc or plasma, the electric energy source can be used to reduce further the amount of hot iron which can be charged, by utilizing electric energy to accomplish the later part of scrap preheating and/or melting after the major part of oxygen lancing takes place following the charging of hot iron. An electrical energy source may be also used during melt refining. In all of the above described embodiments utilization of auxiliary electrical energy should increase metallic yield and improve the flexibility of melt refining cycle.

D. Fourth Process Embodiment

When a steel making furnace is equipped with an auxiliary electrical energy source, the following embodiment of the present invention is to be used. Although electrical energy is the most expensive energy used in this embodiment, it can be utilized most efficiently during the final stage of melting and refining. During these periods of the steel making cycle the iron-carbon melt already exists, so that the bottom of the furnace is well protected when an electric arc is established above the melt or when a plasma stream is directed toward the melt. The auxiliary electrical energy will provide for a more controllable energy introduction and for a reduction of the amount of steel scrap burning which is needed for the purposes of melting and melt superheating.

The use of electrical energy as an auxiliary energy source in this embodiment keeps the necessary electrical power consumption relatively small. This significantly reduces the expenses related to use of the electrical energy supplied by electric arc or plasma and provides for improved control over melting and melt superheating. Although electrical energy should be mainly utilized during the final stage of melting and melt superheating, is advisable to use electrical energy in case of emergencies when the introduction of oxygen and/or carbonaceous fuel is interrupted due to the failure of equipment or due to other production and technical necessities.

Figure 4:
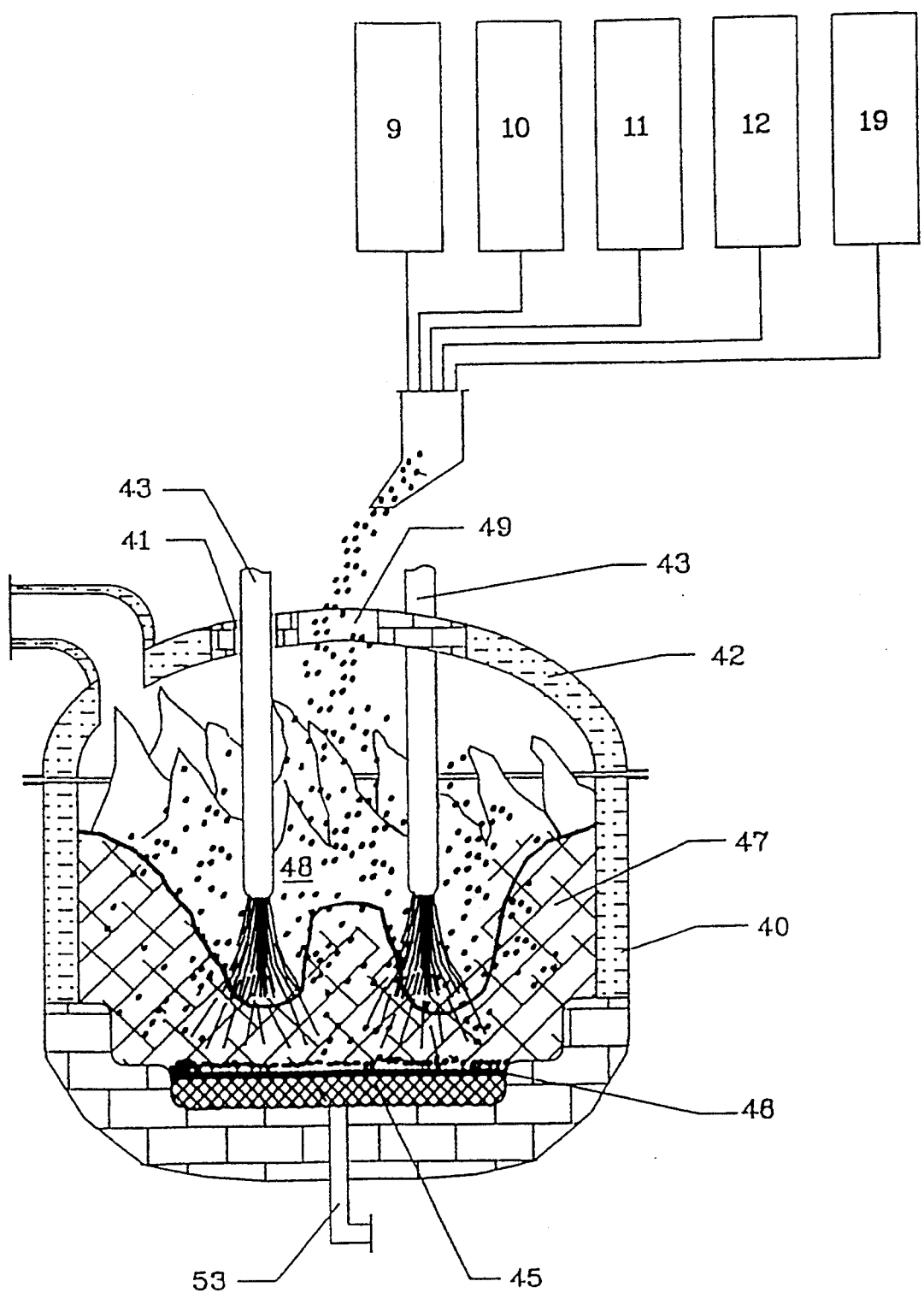
FIG. 4 is a schematic view of a cross-section of an EAF vessel and its charges illustrating a fourth embodiment of the invention.

This embodiment can be carried out by utilizing a modified EAF 40 shown in FIG. 4. Holes 41 in a movable water-cooled roof 42 can be used to provide for the introduction of movable single or multiple lance means 43 through these holes during preheating and melting.

Slag forming material is preferably first charged on the top of slag retained from the previous heat to increase the basicity and viscosity of thickened slag 45. Carbonaceous material 46 is then preferably charged on the top of this thickened slag. A first steel scrap charge 47 is further charged on the top of said carbonaceous material and one or more preferably movable lances 43 are moved through the roof 42 into the space 48 located above said scrap charge.

Figure 5:
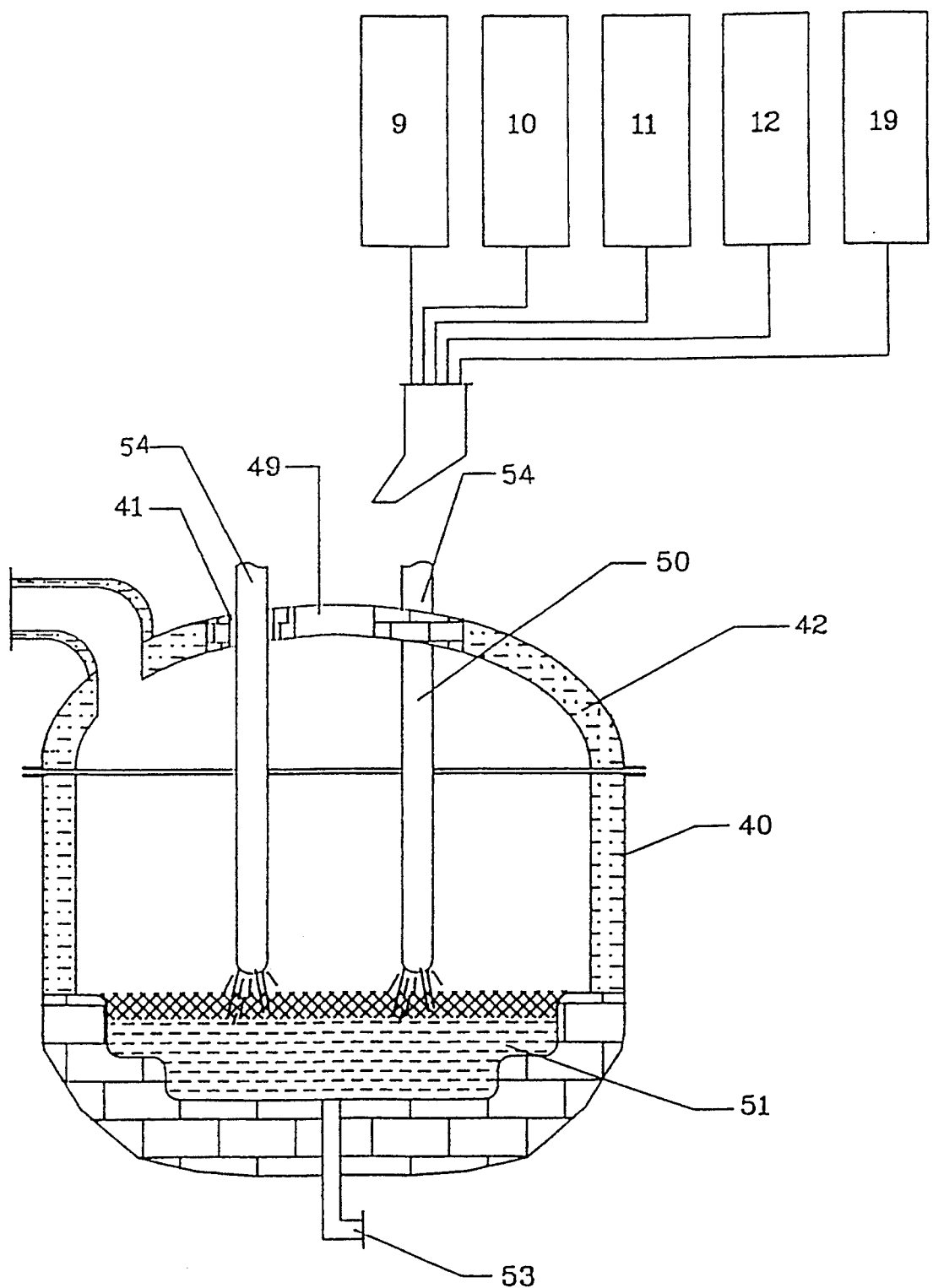
FIG. 5 is a schematic view of a cross-section of an EAF vessel and its charges further illustrating the fourth embodiment of the invention.

Then the process of oxidizing gas blowing via these lances is initiated. Simultaneously or prior to such blowing two types of carbonaceous materials, as described for the previous embodiments, are charged through the opening 49 in the furnace roof. The charging of carbonaceous materials is conducted continually, as described for the previous embodiments, during the preheating and melting stages of the steel making process. When a single lance is used, the lance is positioned essentially along the central axis of the furnace. When multiple lances are used, they are located close to the central axis of the furnace, preferably in such positions that the holes used to introduce lances also can be used after lances are removed to introduce graphite electrodes 50 as shown in FIG. 5, during the final state of melting and iron-carbon melt 51 superheating. EAF modifications should be made that provide rapid and automated movement of the electrodes 50 and lances 43 into and out of the furnace and that provide for controllable up and down movement inside of the furnace during operation. Bottom blowing means 53 can optionally be used in this embodiment for purposes similar to those described in the first embodiment of this invention.

When single plasma gun or guns are used in place of electrodes, they also may be able to move up and down to provide for better efficiency of scrap melting and iron-carbon melt superheating. The amount of electrical power used in this embodiment should not exceed 350 kwh per ton of steel produced and should preferably be maintained between 50 and 200 kwh per ton of steel produced.

Each of the processes described in the first three embodiments can be improved when conducted with the use of auxiliary electrical energy as described herein.

Operation of all four of these embodiments may be modified for use with combinations of ferrous metallic materials different from that discussed herein but still in the scope and spirit of this invention.

E. Fifth Process Embodiment (Utilizing Intermediate Liquid Metal)

Figure 6:
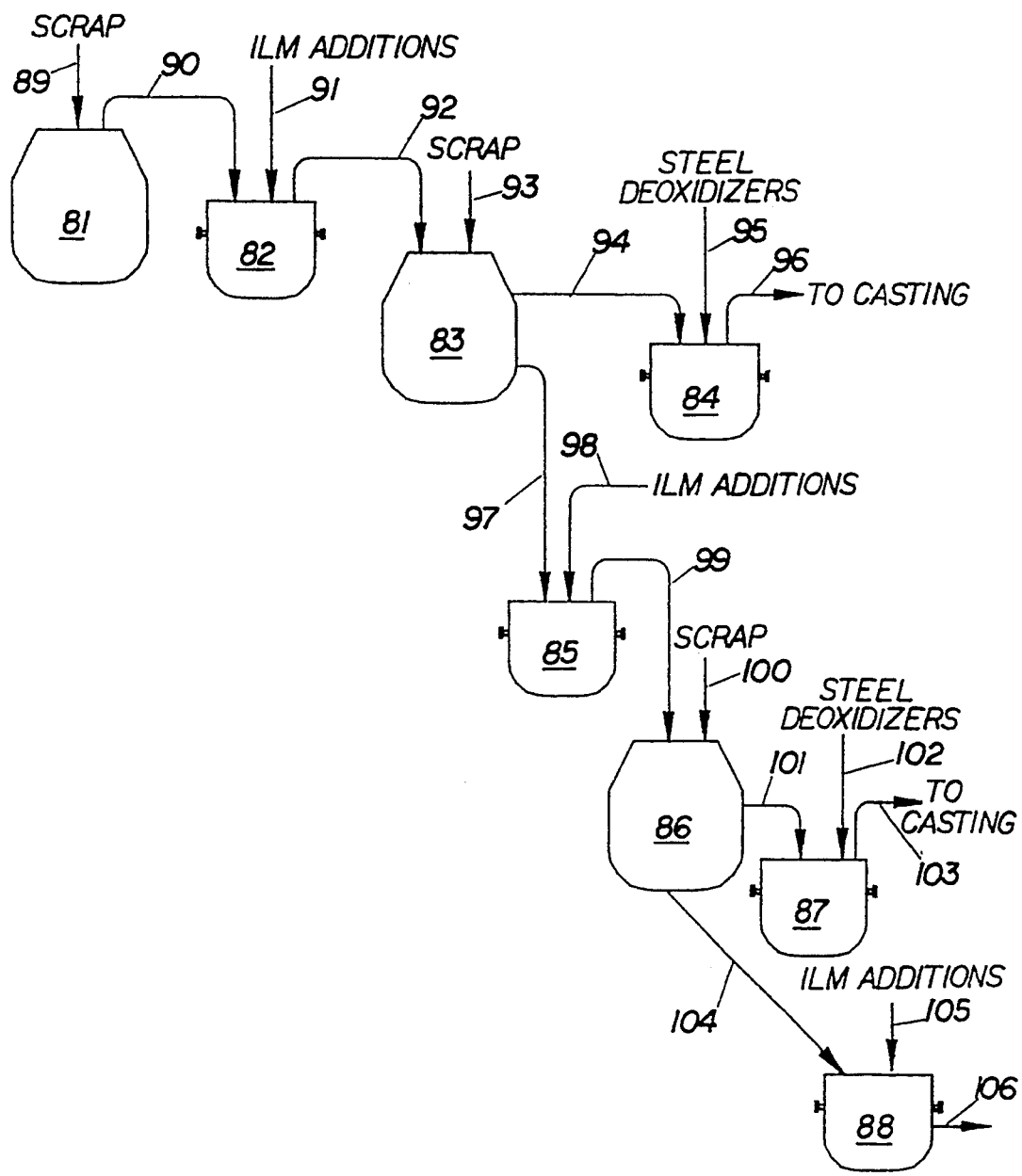
FIG. 6 is a conceptual steel making process flow chart for production of steel in a BOF shop during the absence of blast furnace iron utilizing the fifth embodiment of the invention.
Figure 7:
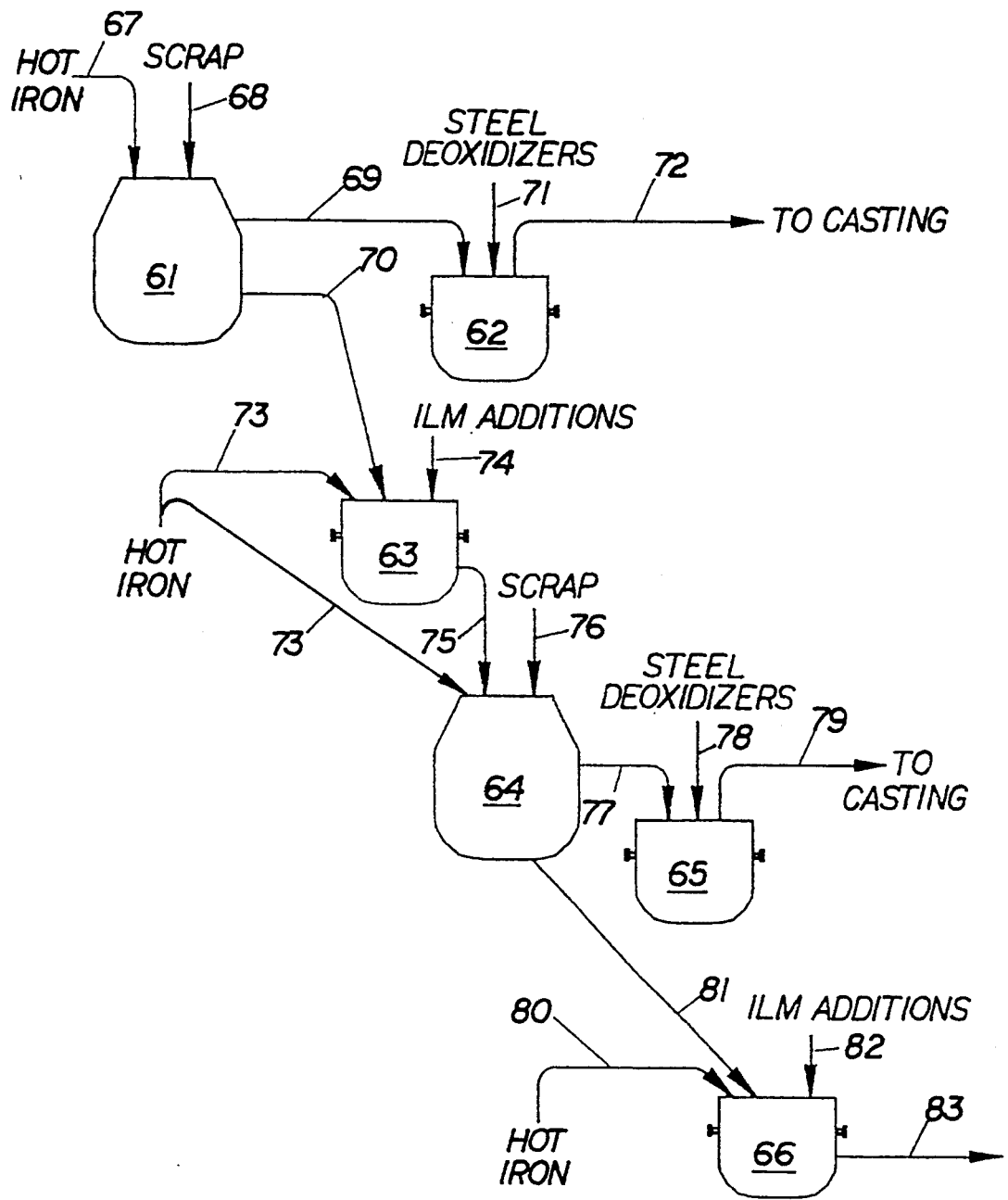
FIG. 7 is a conceptual steel making process flow chart for production of steel in a BOF shop during the limited supply of blast furnace iron utilizing a modification of the fifth embodiment of the invention.

This embodiment of the invention relates to the cases of steel production at BOF shops where limited or no hot iron is available on a temporary or permanent basis. This modification relies on the production of steel with the use of solid ferrous metallic material and intermediate liquid ferrous metallic semi-product which is periodically produced preferably utilizing one of the above-described process modifications, wherein the said intermediate semi-product is first produced by treatment of an initial liquid ferrous metal (preferably steel) tapped from the steel making furnace by adding a charge of material or materials capable of increasing the content of non-ferrous oxidizable components and of decreasing the content of oxygen in said initial liquid ferrous metal. An example of such treatment by carburizing the steel heat made in the basic oxygen furnace is shown in FIGS. 6 and 7. A steel making process flow chart for shops with no hot iron available is shown in FIG. 6, and for shops with some hot iron available is shown in FIG. 7. When the process shown in FIG. 6 is practiced, first the initial heat of liquid steel may be optionally produced in a BOF converter 81 with the use of 100% scrap 83 as described in the first or second embodiment of this invention. Then, the chemistry of this initial heat 90 tapped into the ladle 82 is altered by additional solids 91 (intermediate liquid metal additions "ILM") charged into the ladle 82 to deoxidize the melt and to increase the silicon and carbon content of the produced intermediate liquid ferrous metallic semi-product 92. Then at least part of this intermediate liquid semi-product is used together with a solid ferrous metallic charge 93 to produce the next heat of steel 83. The amount of solid metallic charge 93 added to produce the heat #2 depends upon the size of the first heat 90 and the size of the BOF vessel. The steel heat 83 may be tapped into a single ladle 84 and then used at the caster, or (as shown in FIG. 6) this steel heat can be tapped in two ladles 84 and 85. The weight of each of these two taps 84 and 85 may be made different for different cases. The first portion 94 of tapped steel is deoxidized, alloyed and transferred to the casting. The second portion 97 of the tapped steel is treated by the addition of solid charge (ILM additions 98) to be deoxidized and to increase the concentration of silicon and/or carbon and/or manganese and/or aluminum while reducing the melt temperature, and then is transferred to the hot iron charging site (preferably on the rail car and under the converter). After such movement this melt 85 is used as an intermediate liquid metal to produce the next steel heat 86 shown in FIG. 6 preferably utilizing the third embodiment of this invention. After steel heat 86 has been produced, it also may be tapped into one or two ladles 87 and 88. When two ladles are used, one of these ladles 87 is used to produce steel for the caster, and the other 88 is used to produce intermediate liquid metal in the fashion similar to the described above for production of the steel heat 83.

When some amount of hot pig iron or other liquid ferrous metallic material 67 is available, this material can be added to the intermediate liquid metal prior to the charging of intermediate liquid metal into the BOF converter 61 as shown in FIG. 7.

This available liquid ferrous material 73 can be also charged directly into the BOF vessel 64 following or prior to the intermediate liquid metal 75 charging. It is also possible to use these two liquid metal charges in a way described in third embodiment of this invention, wherein multiple liquid ferrous metallic charges are used and wherein one of this liquid metal charge initiates the first preheating cycle of solid ferrous metallic charge 76 by top charging of carbonaceous material accompanied by top oxygen blowing. This first preheating cycle is then followed with the charging of a second liquid metallic charge 75. After the second liquid metallic charge, the charging of the rest of the solid metallics 76 is loaded and the steel making process is continued as described above in the third embodiment of this invention.

The intermediate liquid ferrous semi-product 63 and 66 (when produced as described above) will preferably have higher temperature than traditionally used blast furnace hot iron. This intermediate metal may also have lower carbon and possibly silicon and manganese content then blast furnace hot iron.

The tap temperature and chemical composition of initially produced liquid ferrous metallic product 70 and 77 used to make semi-product 63 and 66 can be varied widely without affecting the final quality of steel heats to be produced later on.

For example, the variation of initial ferrous metallic material tap temperature between 1560° C. and 1700° C., carbon content between 0.3 and 0.002%, phosphorus content between 0.2 and 0.01% and sulfur content between 0.04 and 0.01% can be considered satisfactory for successful practicing of this embodiment. Acceptance of such variation makes the production of this initial metallic product very inexpensive. Tapping of initial metallic product into the ladle should be carried out with minimum slag carry over to minimize the use of deoxidizing materials during production of ferrous metallic semi-product. An additional step of electrical heating of said initial ferrous liquid metallic product and/or semi-product (not shown in FIGS. 6 and 7) may be carried out to increase the temperature of liquid metal before, during, or after said treatment of initial liquid ferrous metallic material.

The operation of this invention can be also conducted in furnaces utilizing the injection of additional oxidizing gas into the iron-carbon melt during the later part of the melting and refining through bottom tuyeres to assist the top lancing operation in oxidation of the iron-carbon melt.

While the embodiments of this invention have been described in association with BOF and EAF furnaces, it will be understood that other apparatus can be arranged and designed to conduct steel making processes, as described above, utilizing ferrous metallic charges and solid carbonaceous fuel.

Moreover, while this invention has been described in detail with particular reference to the preferred embodiments thereof, it will be understood that variations and modifications can be effected within the spirit and scope of the method and apparatus of the invention as described herein and as claimed.

What is claimed is:

1. A method of preheating a solid ferrous metallic material wherein the solid ferrous metallic material may be more efficiently used in steelmaking, the method comprising the steps of:
   (a) tapping an initial molten ferrous metallic product out of a steelmaking furnace into a ladle;
   (b) adding additional solid materials to the tapped product to deoxidize the tapped product and to increase the content of at least one oxidizable nonferrous component, thereby converting the tapped product into an intermediate liquid ferrous metallic semi-product;
   (c) introducing the solid ferrous metallic material into the steelmaking furnace;
   (d) introducing the liquid ferrous metallic semi-product into the steelmaking furnace to partially preheat the solid ferrous metallic material; and
   (e) introducing into the steelmaking furnace and combusting a fuel material with the oxidizing gas to add additional heat to preheat the solid ferrous metallic material.

2. The method of claim 1 wherein the at least one oxidizable non-ferrous component is selected from the group consisting of silicon, manganese, carbon, aluminum, and combinations thereof.

3. The method of claim 1 wherein the fuel material is a carbonaceous material.

4. The method of claim 2 wherein the fuel material is a carbonaceous material.

5. A method of creating an intermediate liquid ferrous metallic semi-product useful for providing hot iron to be used in a steel making process comprising the following steps:
   (a) introducing a first basic slag forming solid material into a steelmaking furnace;
   (b) then charging a first solid carbonaceous fuel material including volatile hydrocarbons into the furnace;
   (c) then charging a first solid ferrous metallic material into the furnace;
   (d) preheating at least a part of the first solid ferrous metallic material to produce a first preheated solid ferrous metallic material by a process comprising the substeps of:
      i. blowing a controllable flow of oxidizing gas toward the charged solid ferrous metallic material with a lancing means having a tip for directing the flow of oxidizing gas, wherein the tip is positioned above the first solid ferrous metallic material; and
      ii. essentially simultaneously with the blowing substep, charging continually on top of the first solid ferrous metallic material a controllable amount of a second solid carbonaceous fuel material including a higher average concentration of volatile hydrocarbons than the first solid carbonaceous material; wherein the second solid carbonaceous fuel material is at least partially combusted to preheat the first solid ferrous metallic material;
   (e) then burning a first portion of the first preheated ferrous metallic material in a central zone of the furnace to release additional heat to melt at least a second portion of the first preheated solid ferrous metallic material located in an area remote from the central zone, while protecting the second portion of the first preheated solid ferrous metallic material from oxidation;
   (f) accumulating a first molten ferrous metal at the bottom of the furnace;
   (g) at least partially refining and at least partially superheating the accumulated first molten ferrous material above the melting point by a process including the substeps of:
      i. charging additional basic slag forming material into the furnace; and
      ii. blowing additional oxidizing gas with the lancing means;
   (h) tapping from the steelmaking furnace into a ladle the first molten ferrous metal and at least a part of the resulting slag material after the desired tap temperature is reached;
   (i) adding first intermediate solid additions to the first molten ferrous metal to deoxidize the first molten ferrous metal and to increase the silicon and carbon content thereof, thereby creating the intermediate liquid ferrous metallic semi-product.

6. The method of claim 5 wherein the first molten ferrous metallic material is tapped essentially separately from the resulting slag.

7. A method of creating a secondary intermediate liquid ferrous metallic semi-product useful for providing hot iron to be used in a steel making process, the method comprising the following steps:
   (a) adding a second solid ferrous metallic charge to the intermediate liquid ferrous metallic semi-product of claim 5 to produce a second molten ferrous metal;
   (b) tapping at least a portion of the second molten ferrous metal out of a steelmaking furnace into a ladle; and
   (c) adding second intermediate solid additions to the tapped portion of the second molten ferrous metal to deoxidize the tapped portion and to increase the concentration of at least one element selected from the group consisting of silicon, carbon, manganese, and aluminum, thereby forming the secondary intermediate liquid ferrous metallic semi-product.

8. A method of steelmaking, conducted in an at least partially refractory-lined steelmaking furnace, comprising the steps of:
   (a) charging a charge of solid ferrous metallic material into the steelmaking furnace;
   (b) preheating said solid ferrous metallic material by a process comprising the substeps of:
      i. charging into the furnace a hot molten ferrous metallic semi-product comprising molten product previously tapped from the steelmaking furnace to which additives have been added to deoxidize the tapped product and to increase the content of at least one oxidizable non-ferrous component;

ii. blowing a controllable flow of oxidizing gas toward said solid ferrous metallic material with a lancing means having a tip for directing the flow of oxidizing gas, wherein the tip is positioned above said solid ferrous metallic material charged in the previous step; and iii. essentially simultaneously with said blowing substep, charging continually on top of said solid ferrous metallic material a controllable amount of a solid carbonaceous material comprising volatile hydrocarbons, wherein said solid carbonaceous material is at least partially combusted to preheat the said solid ferrous metallic material charged in the previous step;

(c) then burning a first portion of the preheated ferrous metallic material in a central zone of the furnace to release additional heat to melt at least a second portion of the preheated solid ferrous metallic material while protecting said second portion from oxidation, thereby creating a second molten ferrous metallic material and wherein the burning step further comprises the substeps of:

i. directing the flow of oxidizing gas towards a central zone of the furnace; and ii. moving the tip of the lancing means closer to the bottom of the furnace;

(d) accumulating a mixture comprising partially oxidized first hot molten ferrous metallic material and the second molten metallic material at the bottom of the furnace;

(e) at least partially refining and at least partially superheating said accumulated mixture up to a predetermined tap temperature by a process including the substeps of:

i. charging a first charge of basic slag-forming material, thereby forming a slag; and ii. blowing additional oxidizing gas with said lancing means to produce a partially refined molten ferrous product; and (f) tapping from the furnace into a ladle the at least partially refined molten ferrous product and at least a part of the slag after the desired tap temperature is reached.

9. The method of claim 8 wherein the at least one oxidizable non-ferrous component is selected from the group consisting of silicon, manganese, carbon, aluminum, and combinations thereof.

10. The method of claim 8 wherein, in the preheating step, the substeps of blowing and of charging the carbonaceous material precede the substep of charging the hot molten ferrous metallic semi-product.

11. The method of claim 8 wherein, in the preheating step, the substep of charging the hot molten ferrous metallic semi-product precedes the substeps of blowing and of charging the carbonaceous material.

12. The method of claim 9 wherein, in the preheating step, the substeps of blowing and of charging the carbonaceous material precede the substep of charging the hot molten ferrous metallic semi-product.

13. The method of claim 9 wherein, in the preheating step, the substep of charging the hot molten ferrous metallic semi-product precedes the substeps of blowing and of charging the carbonaceous material.

14. A method of steelmaking, conducted in an at least partially refractory-lined steelmaking furnace, comprising the steps of:

(a) introducing a first basic slag forming solid material into the furnace;

(b) then charging a first solid carbonaceous material including volatile hydrocarbons;

(c) then charging on top of previously charged materials at least a fraction of a solid ferrous metallic material;

(d) then preheating at least a part of said fraction of the metallic material charged in the preceding step by a process comprising the substeps of:

i. blowing a controllable flow of oxidizing gas toward said charged solid ferrous metallic material with a lancing means having a tip for directing the flow of oxidizing gas, wherein the tip is positioned above said solid ferrous metallic material charged in the preceding step; and ii. essentially simultaneously with said blowing substep, charging continually on top of said solid ferrous metallic material a controllable amount of at least a second solid carbonaceous fuel material including a higher average concentration of volatile hydrocarbons than said first solid carbonaceous material; wherein said second solid carbonaceous fuel material is at least partially combusted to preheat the fraction of said solid ferrous metallic material charged in the preceding step;

(e) then burning a first portion of the preheated ferrous metallic material in a central zone of the furnace to release additional heat to melt at least a second portion of the preheated solid ferrous metallic material located in an area remote from the central zone, while protecting said second portion from oxidation;

(f) accumulating molten ferrous metal at the bottom of the furnace;

(g) at least partially refining and at least partially superheating said accumulated molten ferrous material above the melting point by a process including the substeps of:

i. charging additional basic slag forming solid material into the furnace; and ii. blowing additional oxidizing gas with said lancing means;

(h) charging into the furnace a hot molten ferrous metallic semi-product comprising molten product previously tapped from the steelmaking furnace to which additives have been added to deoxidize the previously tapped product and to increase the content of at least one oxidizable non-ferrous component, wherein the first hot molten ferrous metallic material is charged earlier than the step of charging the additional basic slag-forming materials but later than the first charging of at least a portion of the solid ferrous material; and (i) tapping from the steelmaking furnace to a ladle said molten ferrous metal and at least a part of a resulting liquid slag material after the desired tap temperature is reached.

15. The method of claim 14 wherein the at least one oxidizable non-ferrous component is selected from the group consisting of silicon, manganese, carbon, aluminum, and combinations thereof.

16. A method of steelmaking, conducted in an at least partially refractory-lined steelmaking furnace equipped with an electrical heating means, comprising the steps of:

(a) charging a charge of solid ferrous metallic material into the furnace;
(b) preheating said solid ferrous metallic material by a process comprising the substeps of:
  i. charging into the furnace a hot molten ferrous metallic semi-product comprising molten product previously tapped from the steel making furnace to which additives have been added to deoxidize the tapped product and to increase the content of at least one oxidizable non-ferrous component;
  ii. blowing a controllable flow of oxidizing gas toward said solid ferrous metallic material with the lancing means; and
  iii. essentially simultaneously with said blowing substep, charging continually on top of said solid ferrous metallic material a controllable amount of a solid carbonaceous material comprising volatile hydrocarbons, wherein the volatile hydrocarbons are at least partially combusted to preheat said solid ferrous metallic material charged in said step of charging solid ferrous metallic material;
(c) melting the solid ferrous metallic material by introducing heat energy from the electrical heating means;
(d) accumulating molten ferrous metallic material at the bottom of the furnace;
(e) at least partially refining and at least partially superheating said accumulated molten ferrous metallic material up to a predetermined tap temperature by a process including the substeps of:
  i. charging a first charge of basic slag-forming Solid materials, thereby forming a slag; and
  ii. blowing additional oxidizing gas with said lancing means to produce a partially refined molten ferrous product, wherein the lancing means has a tip for directing the oxidizing gas and said tip is positioned above the accumulated molten ferrous metallic material; and
(f) tapping from the steelmaking furnace to a ladle the partially refined molten ferrous product and at least a part of the slag after the desired tap temperature is reached.

17. The method of claim 16 wherein the at least one oxidizable non-ferrous component is selected from the group consisting of silicon, manganese, carbon, aluminum, and combinations thereof.

* * * * *